(12) United States Patent　　(10) Patent No.:　US 9,493,127 B2
Kurokawa　　(45) Date of Patent:　Nov. 15, 2016

(54) ELECTRICAL CONTROL SYSTEM

(71) Applicant: Renesas Electronics Corporation, Kawasaki-shi (JP)

(72) Inventor: Tatsufumi Kurokawa, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 423 days.

(21) Appl. No.: 14/134,426

(22) Filed: Dec. 19, 2013

(65) Prior Publication Data
US 2014/0239714 A1　Aug. 28, 2014

(30) Foreign Application Priority Data

Feb. 26, 2013　(JP) .................................. 2013-036289

(51) Int. Cl.
*B60R 16/03*　(2006.01)
*H02J 1/00*　(2006.01)

(52) U.S. Cl.
CPC .............. *B60R 16/03* (2013.01); *Y10T 307/25* (2015.04)

(58) Field of Classification Search
CPC ............................ B60R 16/03; Y10T 307/25
See application file for complete search history.

(56) References Cited

U.S. PATENT DOCUMENTS

| 5,589,759 A | 12/1996 | Borgato et al. |
| 8,575,978 B2 | 11/2013 | Komatsu et al. |
| 2012/0306540 A1 | 12/2012 | Komatsu et al. |

FOREIGN PATENT DOCUMENTS

| JP | S64-41646 A | 2/1989 |
| JP | H06-174762 A | 6/1994 |
| JP | H11252825 | 9/1999 |
| JP | 2008029160 | 2/2008 |
| JP | 4618617 B2 | 1/2011 |
| JP | 2012-251772 A | 12/2012 |

OTHER PUBLICATIONS

Japanese Office Action dated May 31, 2016 with an English translation thereof.

*Primary Examiner* — Hal Kaplan
(74) *Attorney, Agent, or Firm* — McGinn IP Law Group, PLLC

(57) ABSTRACT

There is provided a semiconductor device including a power compensation circuit in an apparatus in order to notify of a power supply disconnection failure that a user of the apparatus may not recognize. The power compensation circuit includes a rectifier circuit and a detection circuit. The rectifier circuit is coupled between a first power supply line and a second power supply line. If the voltage of the second power supply line is lower than the voltage of the first power supply line by a predetermined value or more, the rectifier circuit supplies power from the first power supply line to the second power supply line. The detection circuit outputs a detection signal when the current flows through the rectifier circuit.

20 Claims, 17 Drawing Sheets

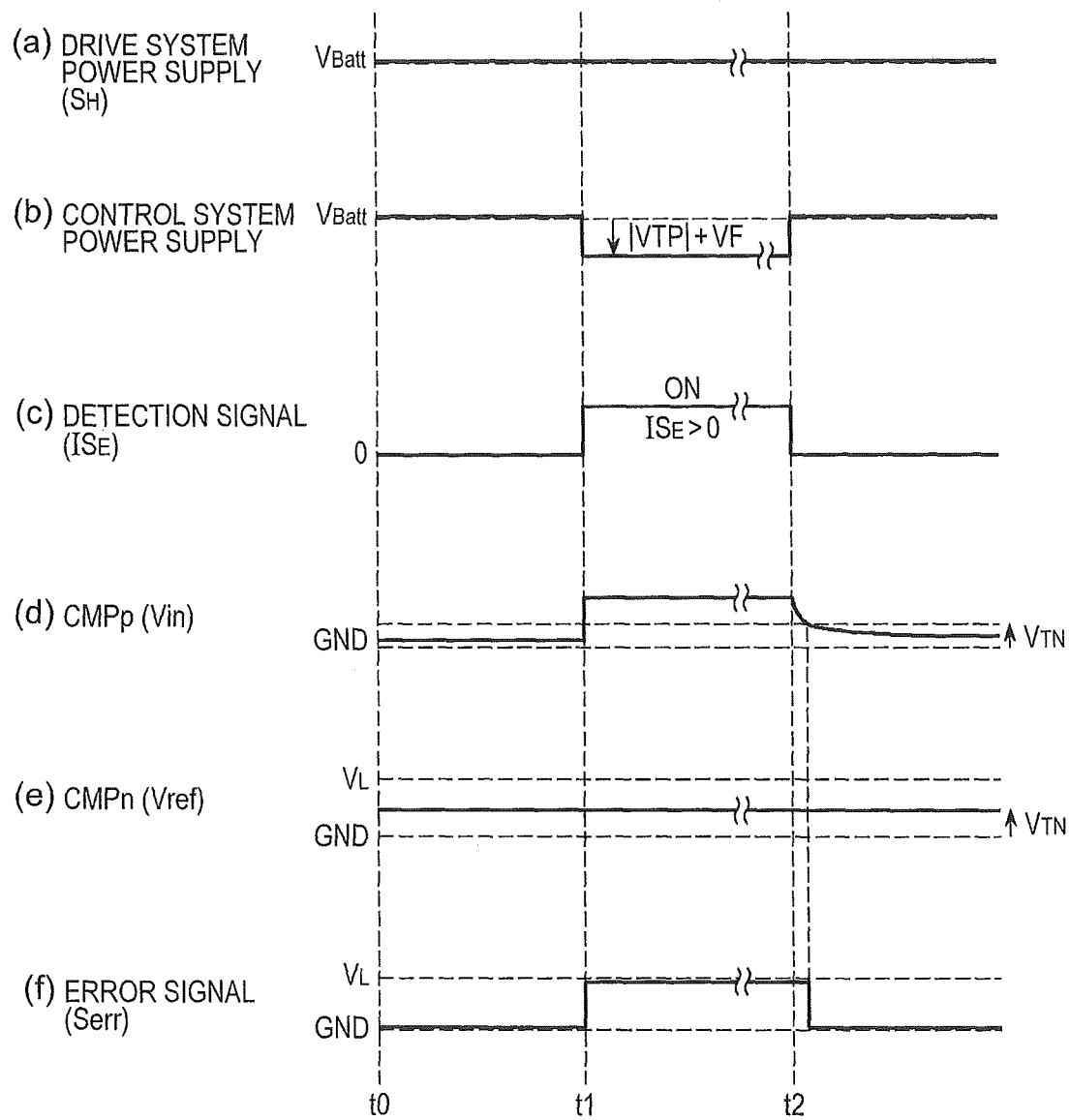

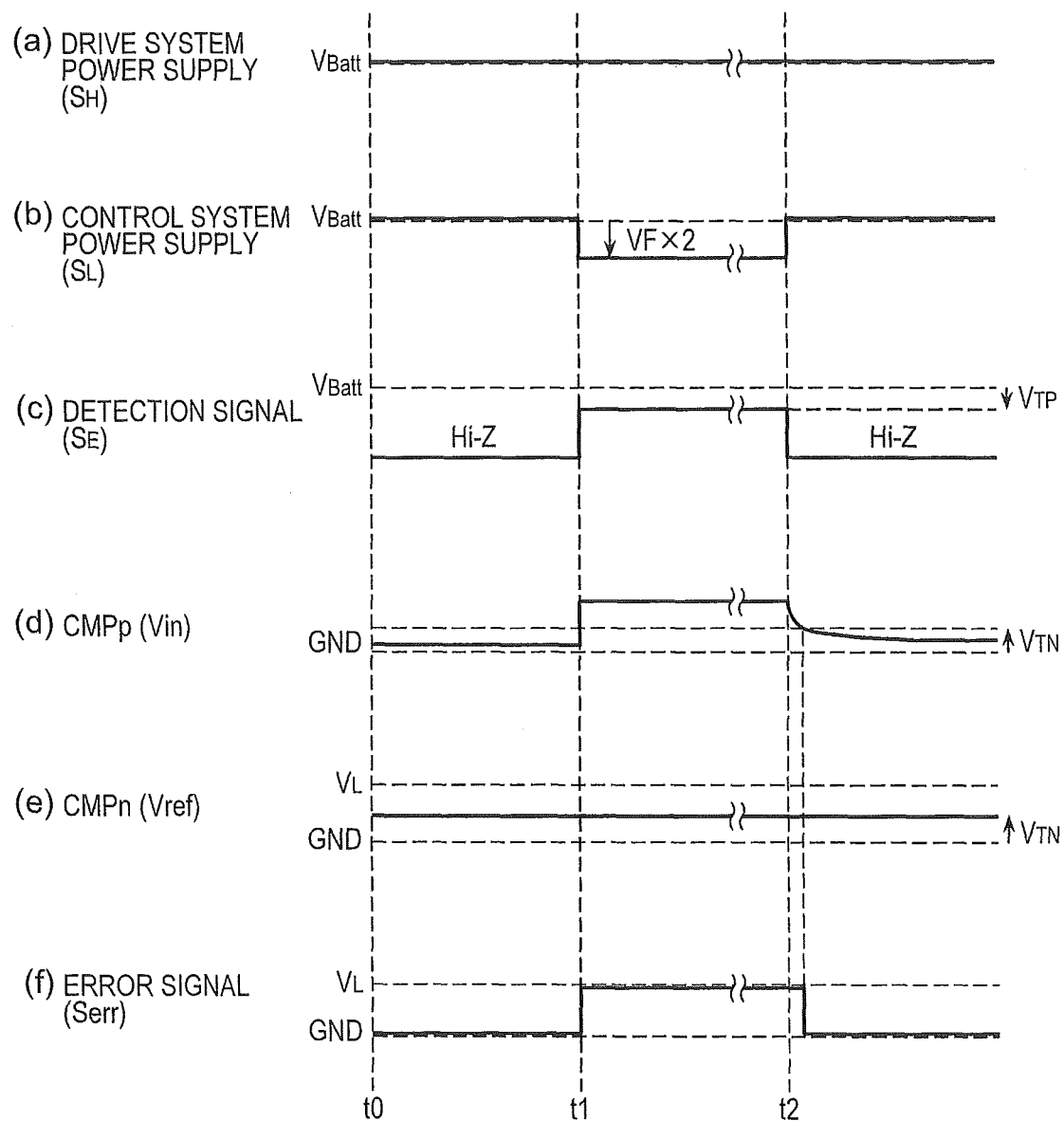

ELECTRICAL CONTROL SYSTEM

CROSS-REFERENCE TO RELATED APPLICATIONS

The disclosure of Japanese Patent Application No. 2013-036289 filed on Feb. 26, 2013 including the specification, drawings and abstract is incorporated herein by reference in its entirety.

BACKGROUND

The present invention relates a semiconductor device and is suitable for use in a semiconductor device, for example, including a circuit for power compensation.

There has been known an apparatus including a drive system block with high power supply noise and a high operating current, and a control system block vulnerable to power supply noise and with a low operating current, which is designed to control the drive system block by the control system block. In this apparatus, when the drive system block and the control system block share a main power supply, separate power supply lines from the main power supply are used in order to reduce the power supply noise. Such an apparatus has a problem that if the power supply line that supplies power to the control system block is disconnected, the drive system block is out of control and headed for crash. To solve this problem, when the power supply line to the control system block is disconnected, power is supplied from the power supply line of the drive system block to the control system block as an emergency measure.

As a related art, Japanese Unexamined Patent Publication No. 2008-29160 discloses a backup power supply device. The backup power supply device is configured such that a main power supply including a first backflow prevention part and a backup power supply including a second backflow prevention part both supply power to the load by a power supply line common to the first and second power supplies. In this backup power supply device, a voltage regulator is provided in the first backflow prevention part to control the voltage of the main power supply so that the voltage between the terminals of the second backflow prevention part is zero.

Japanese Unexamined Patent Publication No. Hei 11 (1999)-252825 discloses a vehicle power supply system. This vehicle power supply system includes on-vehicle equipment coupled to a backup power supply line coupled to a battery of a car, as well as an auxiliary battery coupled to the backup power supply line to compensate for voltage drop in the backup power supply. A monitor for monitoring the voltage of the auxiliary battery or monitoring the voltage of the battery may be coupled to the vehicle power supply system.

Japanese Patent No. 4618617 discloses a power supply route failure diagnosis device of an external power supply controller. This power supply route failure diagnosis device is the power supply route failure diagnosis device of an external power supply controller that receives power supply from the external DC power supply. The power supply route failure diagnosis device includes a power supply part, a load drive circuit, a commutation path, a voltage detection part, a communication part, and a control part. The power supply part is coupled between the positive electrode terminal and negative electrode terminal of the external DC power supply by a first power supply route to receive power supply. A load drive circuit is serially coupled to an external load so that the external load is on the side of the positive electrode terminal between the positive and negative electrode terminals of the external DC power supply by a second power supply route. The load drive circuit switches between operation and non-operation of the external load by opening and closing the second power supply route. The commutation path includes a backflow prevention element coupled between the second power supply route between the external load and the load drive circuit and the first power supply route of the power supply part. When the voltage of the second power supply route is higher than the voltage of the first power supply route, the backflow prevention element of the commutation path commutates the power supply from the second power supply route to the first power supply route. The voltage detection part detects the power supply voltage in the power supply part. The communication part receives the power supply voltage value detected by the other controller with the same configuration and specifications to receive power supply from the external DC power supply. The control part is coupled to the load drive circuit, the voltage detection part, and the communication part. The control part includes a failure diagnosis part. When the difference between the power supply voltage value detected by the voltage detection part and the power supply voltage value in the other controller from the communication part is a predetermined value or more, the failure diagnosis part of the control part determines that a failure occurs in the first power supply route.

SUMMARY

As described above, in the apparatus using the main power supply common to the drive system block and the control system block, it is designed to supply power from the power supply line of the drive system block to the control system block when the power supply line to the control system block is disconnected. The power supply is automatically and instantaneously performed so that the operation of the control system block is not influenced by the failure. Since the power compensation to the control block is automatically performed, the disconnection is observed as if it did not occur. For this reason, it has been very difficult to configure an alarm generation circuit to inform the user that the power supply line to the control system block is disconnected.

The above and other preferred aims and novel characteristics of the present invention will be apparent from the description of the present specification and the accompanying drawings described below.

According to an embodiment of the present invention, there is provided a semiconductor device in which when the voltage of a control power supply line is lower than the voltage of a drive system power supply line by a predetermined value or more, a rectifier circuit supplies power by allowing a current to flow from a drive system power supply line to a control system power supply line, and a detection circuit detects that the current flows through the rectifier circuit and outputs a detection signal.

According to the present invention, it is possible to notify of a power supply disconnection failure that the user of the apparatus may not recognize in power compensation.

BRIEF DESCRIPTION OF THE DRAWINGS

FIG. 5 is a waveform diagram showing the signal voltage of the power compensation circuit as the semiconductor device according to the second embodiment;

FIG. 11 is a waveform diagram of the signal voltage of the power compensation circuit as the semiconductor device according to the fourth embodiment.

DETAILED DESCRIPTION

First Embodiment

Hereinafter, a semiconductor device according to a first embodiment will be described with reference to the accompanying drawings.

1. System Using a Semiconductor Device
Configuration

Figure 1:
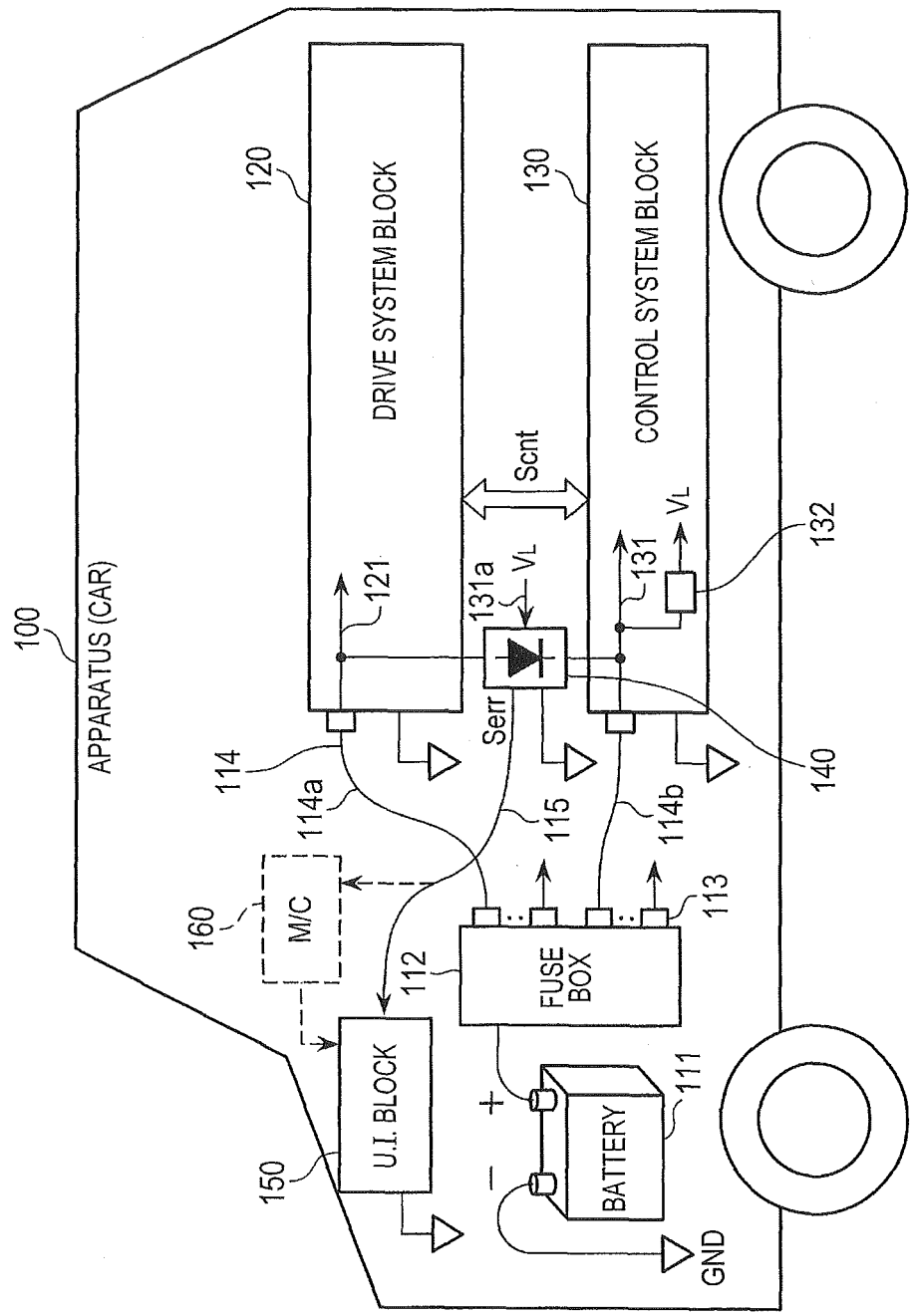
FIG. 1 is a block diagram of an example of an apparatus using a semiconductor device according to a first embodiment of the present invention.

The configuration of an apparatus using a semiconductor device according to a first embodiment of the present invention will be described. FIG. 1 is a block diagram of an example of an apparatus using a semiconductor device according to the present embodiment. The figure shows a configuration example of an apparatus 100 using a power compensation (bypass) circuit 140 as the semiconductor device according to the present embodiment. In the following description, a car is exemplified as the apparatus 100.

It can be seen that the apparatus 100, as an electrical control system, includes a drive system block (120), a control system block (130), a power compensation circuit (140), and a notification device (150). However, the drive system block (120) is supplied with the power from a main power supply (111) through a first power supply line (114a+121). The control system block (130) is supplied with the power from the main power supply (111) through a second power supply line (114b+131). The power compensation circuit (140) is provided between the drive system block (120) and the control system block (130). If the voltage of the second power supply line (131) is lower than the voltage of the first power supply line (121) by a predetermined value or more, the power compensation circuit (140) supplies power by allowing a current to flow from the first power supply line (121) to the second power supply line (131). Then, the power compensation circuit (140) outputs a detection signal (SE) when the current flows. The notification device (150) notifies (the user, and the like) of abnormality, in response to a signal based on the detection signal (SE) output from the power compensation circuit (140).

As described above, the electrical control system uses the power compensation (bypass) circuit 140 as the semiconductor device according to the present embodiment. Thus, when the voltage of the second power supply line (131) is lower than the voltage of the first power supply line (121) by a predetermined value or more, the electrical control system can supply power by allowing a current to flow from the first power supply line (121) to the second power supply line (131). Then, in response to the detection signal (SE) indicating that the current flows, the electrical control system can notify (the user, and the like) of abnormality through the notification device (150). With this configuration, it is possible to notify of a power disconnection failure that the user of the apparatus may not recognize. Next, the apparatus 100 will be described below.

Specifically, the apparatus 100 includes a battery 111, a power supply terminal board (fuse box) 112, a connector 113, a harness 114 (114a, 114b), a drive system block 120, a control system block 130, a user interface (U. I.) block 150, and a power compensation circuit 140.

The battery (main power supply) 111 is a secondary battery that can be charged and discharged, which is a single battery or a group of a plurality of batteries. The battery 111 has a positive electrode terminal (+) with higher potential and a negative electrode terminal (−) with lower potential. For example, the negative electrode terminal (−) is coupled to the system ground GND for a negative earth car. Hereinafter, the system ground GND is referred to as the reference power supply GND. Also, the voltage of the reference power supply GND is referred to as the reference power supply voltage or reference power supply voltage GND. A line from the positive electrode terminal (+) is coupled to the power supply terminal board 112.

The power supply terminal board 112 includes a fuse for overcurrent prevention, and a connection terminal coupled to the connector 113. The power supply terminal board 112 outputs power from the connection terminal through the fuse. There are plurality of fuses and connection terminals, which are classified by the type of use of the power and are integrated together. Particularly, the power supply route to the drive system block 120 and the power supply route of the control system block 130 are generally configured by a plurality of power supply lines (first power supply line, second power supply line, and the like) with the fuses and the connection terminals separated from each other. This is because the drive system block 120 has a high operation current and may generate power supply noise, such as the inrush current by the capacitive load, the reverse voltage by the inductive load, and the voltage drop by the high current, while the control system block 130 has a low operation current and relatively vulnerable to the noise.

The harness (power wiring cable) 114 is provided for each connection terminal of the power supply terminal board 112 and has a connector 113 at both ends thereof. The connector 113 at one end of the harness 114 is coupled to the connection terminal of the power supply terminal board 112, and the connector 113 at the other end of the harness 114 is coupled to the connector terminal of the drive system block 120 or the control system block 130. The power supply terminal board 112 supplies power to the drive system block 120 and the control system block 130 through the harness 114. For example, the power supply terminal board 112 supplies power to the drive system block 120 through a harness 114a, and supplies power to the control system block 130 through a harness 114b.

The drive system block 120 runs with a positive voltage supplied through the power supply line of the harness 114a (including the connector 113), as well as a reference power supply voltage GND. Further, the drive system block 120 includes a drive system power supply line 121 coupled to the connector at the other end of the harness 114a. Thus, the drive system block 120 drives a drive control circuit (not shown) and a drive device (not shown) by the power supplied through the harness 114a and the drive system power supply line 121 (first supply line). An example of the drive control circuit is an electronic circuit (not shown) including a circuit board in which a chip (for example, a power device such as MOSFET and IGBT, a control IC, and an LSI having a function of both the power device and the control IC). Examples of the drive device are a motor, a solenoid, an electric bulb, a video camera, and a car audio system. The motor, the solenoid, and the electric bulb are inductive loads, which return counter electromotive voltage noise to the power supply line at start up and stopping. The video camera and the car audio system are capacitive loads that generate inrush current noise at start up. Further, the consumption current during operation in the drive system block 120 is higher than that in the control system block 130.

The control system block 130 runs with a positive voltage supplied through the power supply line of the harness 114b (including the connector 113), as well as a reference power supply voltage GND. Further, the control system block 130 includes a control system power supply line 131 coupled to the connector at the other end of the harness 114b. Thus, the control system block 130 operates a control circuit (not shown) by the power supplied from the harness 114b and the control system power supply line 131 (second supply line). An example of the control circuit is an electronic circuit (not shown) including a circuit board in which a semiconductor chip (for example, IC or LSI) is mounted. The control system block 130 sends a control signal Scnt to the drive system block 120 to control the operation of the drive system block 120. At the same time, the control system block 130 receives operation information of the drive system block 120 from the drive system block 120 as the control signal Scnt, and feeds back to the control operation of the electronic circuit. Further, the control system block 130 includes a power supply circuit 132 to supply power to the electronic circuit within the control system block 130. The power supply circuit 132 generates a logic power supply VL by reducing the supply voltage from the battery 111. The logic power supply VL is necessary to operate the semiconductor chip (for example, IC or LSI) within the control system block 130. The logic power supply VL is supplied to an electronic circuit, in particular, a logical operation circuit (MPU or other logic device) mounted in the control system block 130. Further, the logic power supply VL is supplied to the power compensation circuit 140 through a cable or a power supply line 131a (third power supply line) within the circuit.

The user interface block 150 runs with a positive voltage supplied through the power supply line (not shown) of the harness and the connector, as well as the reference power supply voltage GND. This power supply line may be common to the power supply line coupled to the other control circuit, as long as it is not the drive system block 120. Further, a signal input circuit of the user interface block 150 reduces the positive voltage and uses as the other logic power supply based on the reference power supply voltage. Thus, it is necessary that the signal input to the user interface block 150 should be the signal based on the reference power supply voltage. Further, the user interface block 150 has a display device (not shown). The display device includes a liquid crystal display, a meter, a lamp, and the like. The display device displays various types of information of the apparatus 100 to the user of the apparatus 100. An example of the various types of information of the apparatus 100 is the security information such as the running speed, the amount of fuel remaining, and the engine coolant temperature. The display device also displays other information such as engine rotation speed, travel distance, and various information and alarm.

The power compensation circuit 140 is coupled to the drive system power supply line 121 and the control system power supply line 131. Further, the power compensation circuit 140 is supplied with the logic power supply VL and the reference power supply GND, as power supply. The power compensation circuit 140 is the electronic circuit and may be included in the control system block 130. Also, the power compensation circuit 140 may be built in the semiconductor chip mounted in the control system block 130. Further, the power compensation circuit 140 may be included in the drive system block 120. Also, the power compensation circuit 140 may be built in the semiconductor chip mounted in the drive system block 120. If the voltage of the second power supply line is lower than the voltage of the first power supply line by a predetermined value or more, the power compensation circuit 140 supplies power by allowing a current to flow from the first power supply line to the second power supply line. Then, the power compensation circuit 140 outputs a detection signal (SE) indicating that the current flows, or an error signal Serr as a signal based on the detection signal SE, to the user interface block 150 via line 115.

Operation

The next describes the operation of the apparatus 100 (FIG. 1) using the power compensation (bypass) circuit 140 as the semiconductor device according to the present embodiment.

The case of a disconnection failure of a power supply line, for example, the harness 114 and the connectors at both ends, due to some reasons is considered. Some reasons may be attributed to the following: minor accident, poor maintenance, time degradation, or other defects. For example, the minor accident means that pebbles and the like on the road are thrown up and strike the power supply line. It is necessary to prevent these defects from causing a serious secondary accident.

First, consideration is made on the case of the cut-off of power supply to the drive system block 120. The failure is detected by the user of the apparatus 100 because the drive system block 120 does not operate. Thus, the user can take appropriate measures to prevent the occurrence of a secondary accident. Further, the system (not shown) of the apparatus 100 monitors to check for a serious failure that the user of the apparatus 100 may not detect. If such a failure occurs, the system of the apparatus 100 displays an alarm in the user interface block 150 to notify the user of the apparatus 100 about the failure. Thus, in this case also, the user can take appropriate measures to prevent the occurrence of the secondary accident.

Next the case where the power supply to the control system block 130 is cut off is considered. In other words, the case to be considered here is that the power supply to the drive system block 120 is normal while the power supply to the control system block 130 that controls the drive system block 120 is cut off. In this case, the drive system block 120 normally runs, so that the failure may not be detected by the sense of the user or the monitoring of the system of the apparatus 100. In this case, even if the drive system block 120 is normal, the desired operation may not be achieved unless the control system block 130 runs. For this reason, a secondary accident is more likely to occur. To avoid this problem, as an emergency measure, the power compensation circuit 140 supplies power to the control system power supply line 131 of the control system block 130, from the drive system power supply line 121 of the live drive system block 120. In this way, it is possible to prevent a secondary accident from occurring due to the cut-off of the power supply to the control system block 130. Of course, the control system block 130 may temporarily malfunction by noise from the drive system power supply line 121. However, the operation desired by the user can be expected in this case, rather than the control system block 130 not running at all. In particular, when the logic power supply VL obtained by reducing the control system power supply line 131 by the power supply circuit 132 is used as the power supply of the semiconductor chip in the control system block 130, the power supply rejection ratio (PSRR) of the voltage drop circuit can be configured to a relatively high value. Thus, the logic power supply VL is sufficiently useful as an emergency measure.

At this time, there is a problem that the drive system block 120 is just normally controlled by the control system block 130 and runs, so that the user of the apparatus 100 may not detect the disconnection of the connector or the harness that supplies power to the control system block 130. Leaving aside emergency situations, in a medium- and long-term perspective, the possibility of malfunction in the control system block 130 due to noise of the drive system power supply line 121 is not eliminated is a problem in terms of the security. In addition, the consumption current is significantly different between the drive system block 120 and the control system block 130. Thus, there is a risk of not detecting the failure related to a short circuit in the control system block 130 with the current control using the same fuse as in the drive system block 120.

In order to solve this problem, the power compensation circuit 140 as the semiconductor device according to the present embodiment performs the following operations. That is, when the power supply to the control system block 130 is cut off, the power compensation circuit 140 temporarily supplies power to the control system power supply line 131 from the drive system power supply line 121. At the same time, the power compensation circuit 140 outputs the detection signal SE indicating that the power is supplied or the error signal Serr based on the detection signal SE, to the user interface block 150. However, for example, when the power compensation circuit 140 outputs the error signal Serr, it is possible to notify a microcomputer (for example, a microcomputer 134 described below) of the control system block 130 about the error signal Serr. In this case, the microcomputer outputs the error signal Serr or a notification signal based on the error signal Serr, to the user interface block 150. Alternatively, it is also possible that the power compensation circuit 140 notifies the other microcomputer 160 of the error signal Serr, and that the microcomputer outputs the error signal Serr to the user interface block 150.

Effect

The apparatus 100 (FIG. 1) using the power compensation circuit 140 as the semiconductor device according to the present embodiment reliably informs the user at an early stage about the failure of the power supply line of the control system block 130 that the user of the apparatus 100 may not detect, in order to prompt the user to repair the failure. In this way, it is possible to avoid hidden security problems which may occur in the apparatus 100.

2. Power Compensation Circuit as the Semiconductor Device

Configuration

Figure 2:
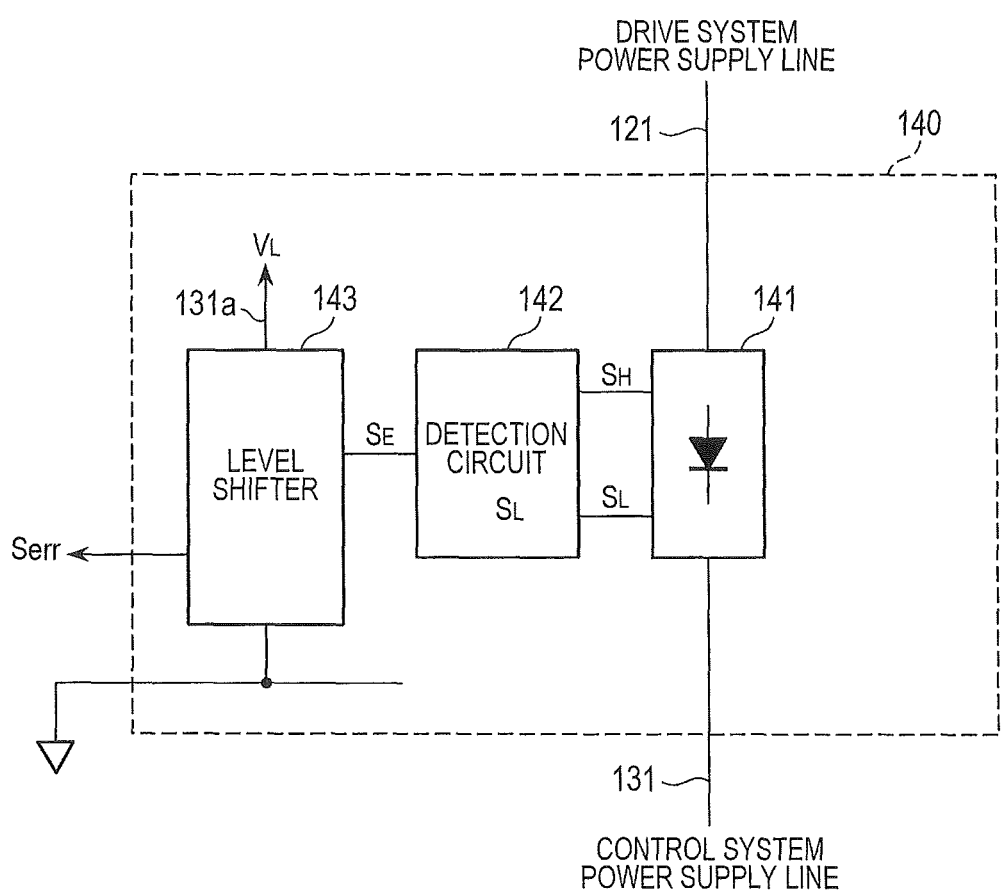
FIG. 2 is a block diagram of an example of the semiconductor device according to the first embodiment.

The configuration of the semiconductor device according to the first embodiment will be described. FIG. 2 is a block diagram of an example of the semiconductor device according to the present embodiment. This figure shows an example of the configuration of the power compensation (bypass) circuit 140 as the semiconductor device according to the present embodiment.

The power compensation circuit 140 as the semiconductor device according to the present embodiment includes a rectifier circuit (141) and an ON detection circuit (142). The rectifier circuit (141) is coupled between a first power supply line (121) and a second power supply line (131). When the voltage of the second power supply line (131) is lower than the voltage of the first power supply line (121) by a predetermined value or more, the rectifier circuit (141) supplies power by allowing a current to flow from the first power supply line (121) to the second power supply line (131). A detection circuit (142) outputs a detection signal (SE) when the current flows to the rectifier circuit (141).

When the voltage of the second power supply line (131) is lower than the voltage of the first power supply line (121) by a predetermined value or more, the power compensation (bypass) circuit 140 can supply power by allowing a current to flow from the first power supply line (121) to the second power supply line (131), and output the detection signal (SE) indicating that the current flows. In this way, it is possible to notify (the user, and the like) of abnormality by the signal based on the detection signal (SE). As a result, it is possible to notify the power supply disconnection failure that the user of the apparatus may not recognize. Next, the power compensation circuit 140 will be described below.

Specifically, the power compensation circuit 140 is coupled to the drive system power supply line 121 and the control system power supply line 131. The power compensation circuit 140 runs with the logic power supply VL and the reference power supply GND, and outputs the error signal Serr. The compensation circuit 140 includes the rectifier circuit 141 and the detection circuit 142, and preferably, includes a level shifter (level conversion circuit) 143. The output of the level conversion circuit is referred to as a level converted signal.

The rectifier circuit 141 includes two input terminals of a high voltage terminal and a low voltage terminal (not shown). Then, the drive system power supply line 121 (first power supply line) is coupled to the high voltage terminal, and the control system power supply line 131 (second power supply line) is coupled to the low voltage terminal. If the voltage of the control system power supply line 131 is lower than the voltage of the drive system power supply line 121 by a predetermined value or more, the rectifier circuit 141 supplies power by allowing a current to flow from the drive system power supply line 121 to the control system power supply line 131.

The detection circuit 142 receives a signal SH corresponding to the high voltage terminal, and a signal SL corresponding to the low voltage terminal, from the rectifier circuit 141. The detection circuit 142 outputs the detection signal SE when the current flows through the rectifier circuit 141, based on the signal SH and the signal SL. The detection circuit 142 runs with the drive system power supply line 121 and the control system power supply line 131, as the power supply. Thus, the output voltage of the detection signal SE is between the voltage of the drive system power supply line 121, and the voltage of the control system power supply line 131. More specifically, the detection signal SE is the current signal of the current value ISE regardless of the output voltage.

The level shifter 143 receives the detection signal SE, which is the current signal, from the detection circuit 142. The level shifter 143 converts the received detection signal SE into a voltage signal between the logic power supply VL and the reference power supply GND. Then, the level shifter 143 outputs the error signal Serr. The logic power supply VL, which is the output power supply of the level shifter 143, is generated by the power supply circuit 132, and is supplied from the third power supply line 131a. The power supply circuit 132 generates and outputs the voltage of the logic power supply VL, which is lower than the voltage of the control system power supply line 131 based on the reference power as the reference voltage GND, from the control system power supply line 131. Thus, it is possible to configure a high power supply voltage variation rejection ratio. The level shifter 143 generates the error signal Serr by using the logic power supply VL. Thus, the loss of the stability and reliability of the error signal Serr can be minimized, even if the power supply circuit 132 generates the logic power supply VL by using the power supply voltage obtained through the rectifier circuit 141 from the drive system block 120 as the control system power supply line 131.

Operation

Next, the operation of the power compensation (bypass) circuit 140 (FIG. 2) as the semiconductor device according to the present embodiment will be described.

If the voltage of the control system power supply line 131 is lower than the voltage of the drive system power supply line 121 by a predetermined value or more, the rectifier circuit 141 supplies power by allowing a current to flow from the drive system power supply line 121 to the control system power supply line 131. Otherwise, the rectifier circuit 141 electrically isolates the drive system power supply line 121 and the control system power supply line 131 from each other.

The detection circuit 142 determines whether the signals SH and SL are input and the rectifier circuit 141 supplies power from the drive system power supply line 121 to the control system power supply line 131. In other words, the detection circuit 142 determines whether the rectifier circuit 141 is turned on or the power flows through the rectifier circuit 141. For example, when the signals SH and SL are the voltage signals, the determination is performed based on the difference between the voltage signals, namely, the magnitude of the voltage difference. Then, if it is determined that the rectifier circuit 141 is turned on (or the current flows through the rectifier circuit 141), the detection circuit 142 activates (outputs) the detection signal SE.

When the detection signal SE is active (or output), the level shifter 143 converts the level of the detection signal SE and outputs the error signal Serr which is the logic signal of the logic power supply VL and the reference power supply GND.

Effect

When a failure occurs in the power supply line of the control system block 130 and the power is supplied from the drive system block 120 to the control system block 130, the power compensation circuit 140 as the semiconductor device according to the present embodiment can detect the failure and output as the detection signal to the outside. The power compensation circuit 140 can notify the outside about the failure in the power supply line of the control system block 130 by using the detection signal. Because of this notification, it is possible to avoid hidden security problems which may occur in the apparatus 100.

(Example of the Mounting of the LSI in the Semiconductor Device)

Figure 3A:
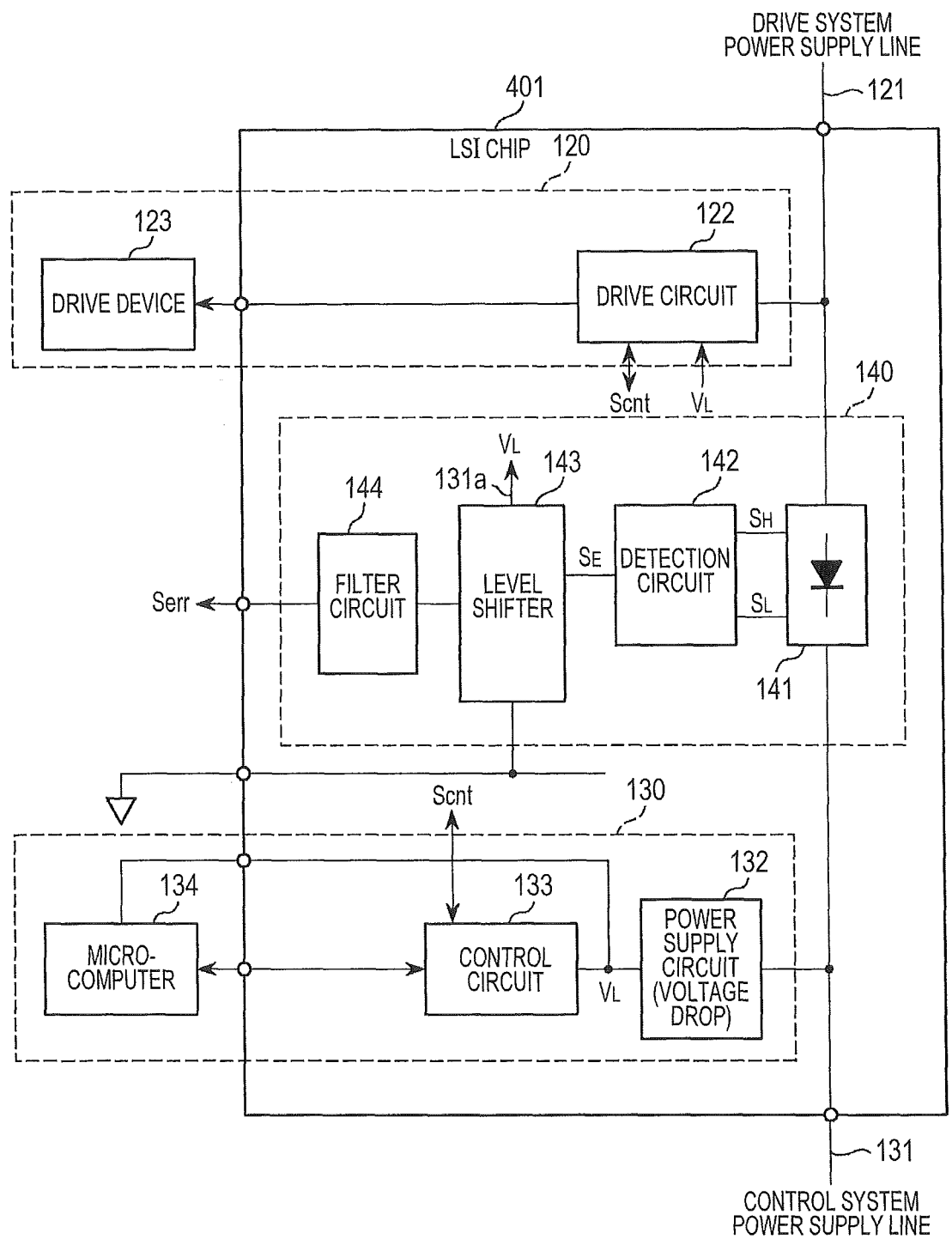
FIG. 3A is a block diagram of an example of the mounting of an LSI chip with respect to a power compensation circuit as the semiconductor device according to the first embodiment.

The power compensation circuit 140 as the semiconductor device according to the present embodiment can be mounted on an LSI chip (semiconductor chip) in various forms. FIGS. 3A to 3D are block diagrams of examples of the mounting of an LSI chip with respect to the power compensation circuit 140 as the semiconductor device according to the present embodiment. FIG. 3A is an example in which a drive circuit 122 of the drive system block 120, the power compensation circuit 140, and a power supply (voltage drop) circuit 132 and a control circuit 133 of the control system block 130 are mounted in a single LSI chip 401. The respective circuits are integrated in a single LSI chip 401, so that it is possible to reduce the whole chip area, increase the process speed, reduce the number of parts, and thereby facilitate the wiring operation. Here, in the drive system block 120, the signal of the drive circuit 122 is output to an external drive device 123 to operate the drive device 123. In the power compensation circuit 140, the detection circuit 142 detects that the power is supplied to the rectifier circuit 141, and outputs the detection signal SE to the level shifter 143. Then, the level shifter 143 converts the level of the detection signal SE and outputs the error signal Serr to the outside (for example, the user interface block 150). In the control system block 130, the power supply circuit 132 reduces the power supplied from the drive system block 120 to generate the logic power supply voltage VL. Then, the power supply circuit 132 supplies the logic power supply voltage VL to the control circuit 133 and the power compensation circuit 140. The control circuit 133 and the external microcomputer 134 perform two-way communication to control the drive system block 120 (for example, the drive circuit 122). Note that the microcomputer 134 may be a circuit board in which a semiconductor chip is mounted, or may be included in the LSI chip 401.

Note that it is also possible that the level shifter 143 outputs the error signal Serr to a filter circuit 144, so that the filter circuit 144 outputs the error signal Serr that is filtered by a predetermined condition, to the outside (for example, the user interface block 150). Here, the filter circuit 144 filters the error signal Serr from the level shifter 143 so that the error signal Serr is not output from the power compensation circuit 140 when the difference in the voltage between the drive system power supply line 121 and the control system power supply line 131 is temporarily increased due to surge and AC induced oscillation. For example, the error signal Serr that is continuously output for a predetermined time is detected and output by a timer.

Figure 3B:
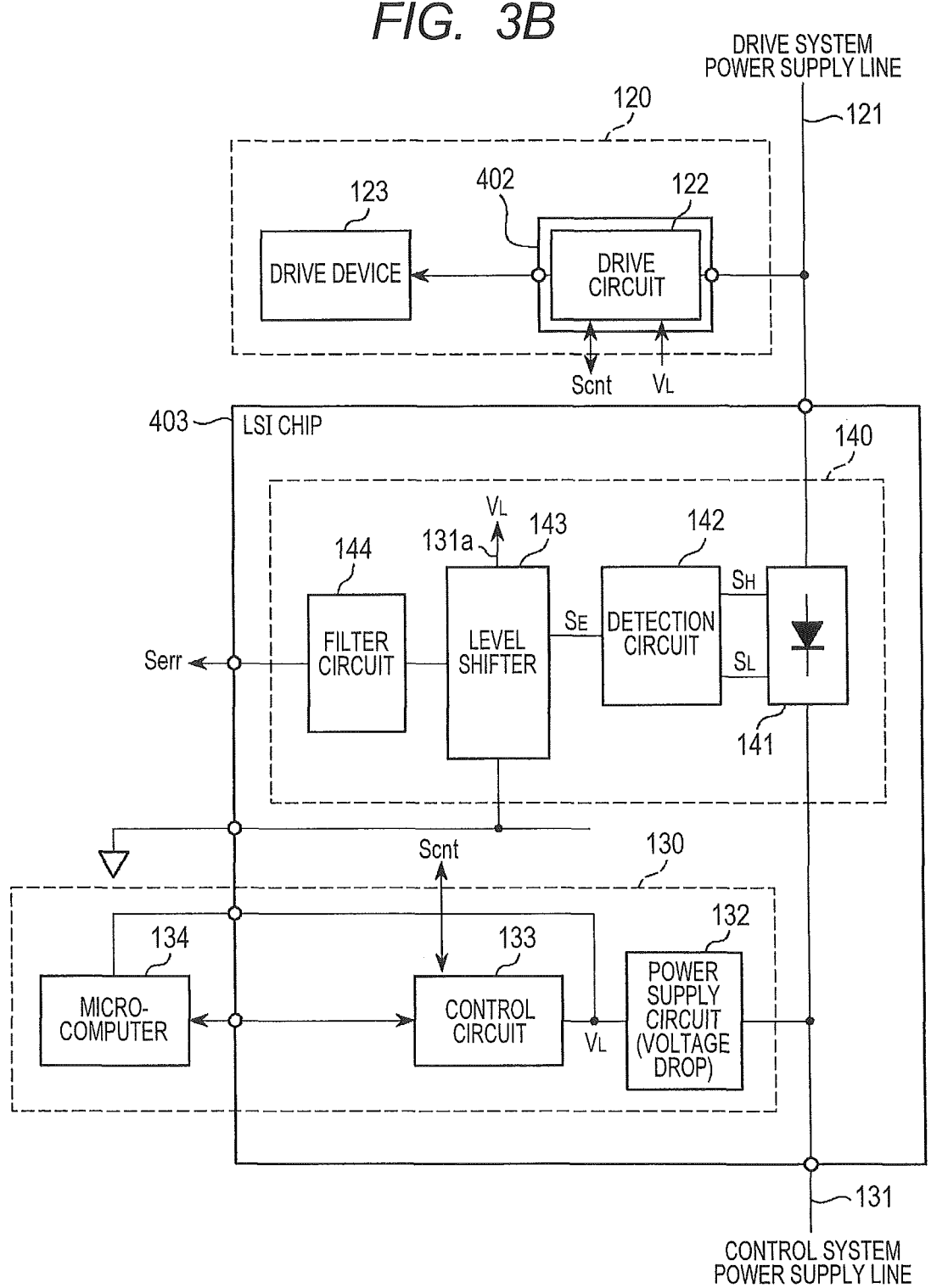
FIG. 3B is a block diagram of another example of the mounting of the LSI chip with respect to the power compensation circuit as the semiconductor device according to the first embodiment.

FIG. 3B is an example in which the drive circuit 122 of the drive system block 120 is mounted on one LSI chip 402, and the power compensation circuit 140 as well as the power supply circuit 132 and control circuit 133 of the control system block 130 are mounted on another LSI chip 403. In this case, the LSI chips are divided by functions to increase the flexibility of the design and wiring. Note that microcomputer 134 may be included in the LSI chip 403. Further, the LSI chip 402 of the drive system block 120 may have a single-chip structure in which the power device and the control IC are mounted on a single chip, or a multi-chip structure in which the power device and the control IC are mounted on separate chips.

Figure 3C:
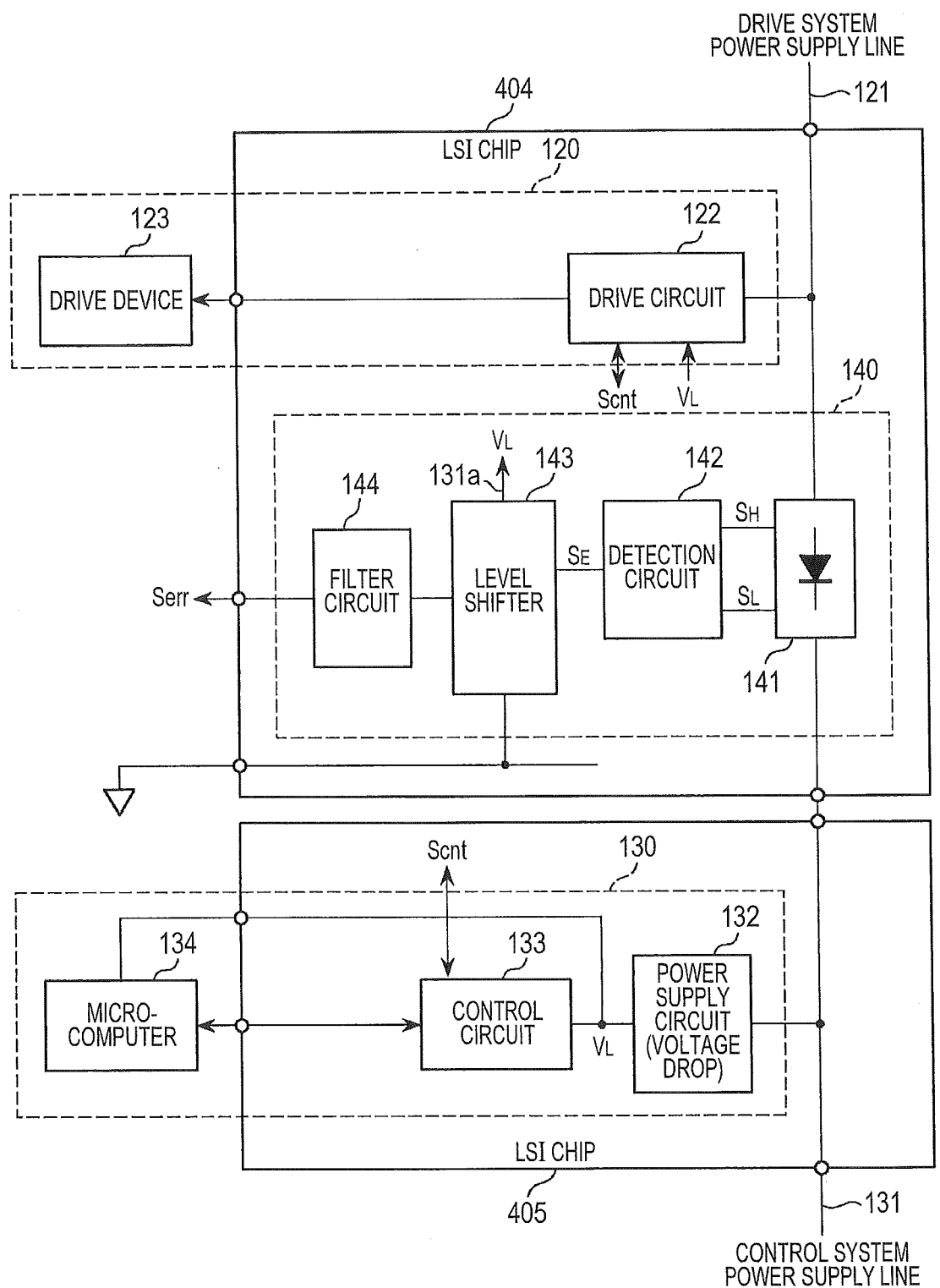
FIG. 3C is a block diagram of another example of the mounting of the LSI chip with respect to the power compensation circuit as the semiconductor device according to the first embodiment.

FIG. 3C is an example in which the drive circuit 122 of the drive system block 120 and the power compensation circuit 140 are mounted on one LSI chip 404, and the power supply circuit 132 and control circuit 133 of the control system block 130 are mounted on another LSI chip 405. In this case, the power compensation circuit 140 is mounted on the LSI chip 404 including the drive circuit 122 with a large circuit area, so that it is possible to reduce the influence of the increase and decrease of the circuit area due to the addition of the power compensation circuit 140. Note that the microcomputer 134 may be included in the LSI chip 405.

Figure 3D:
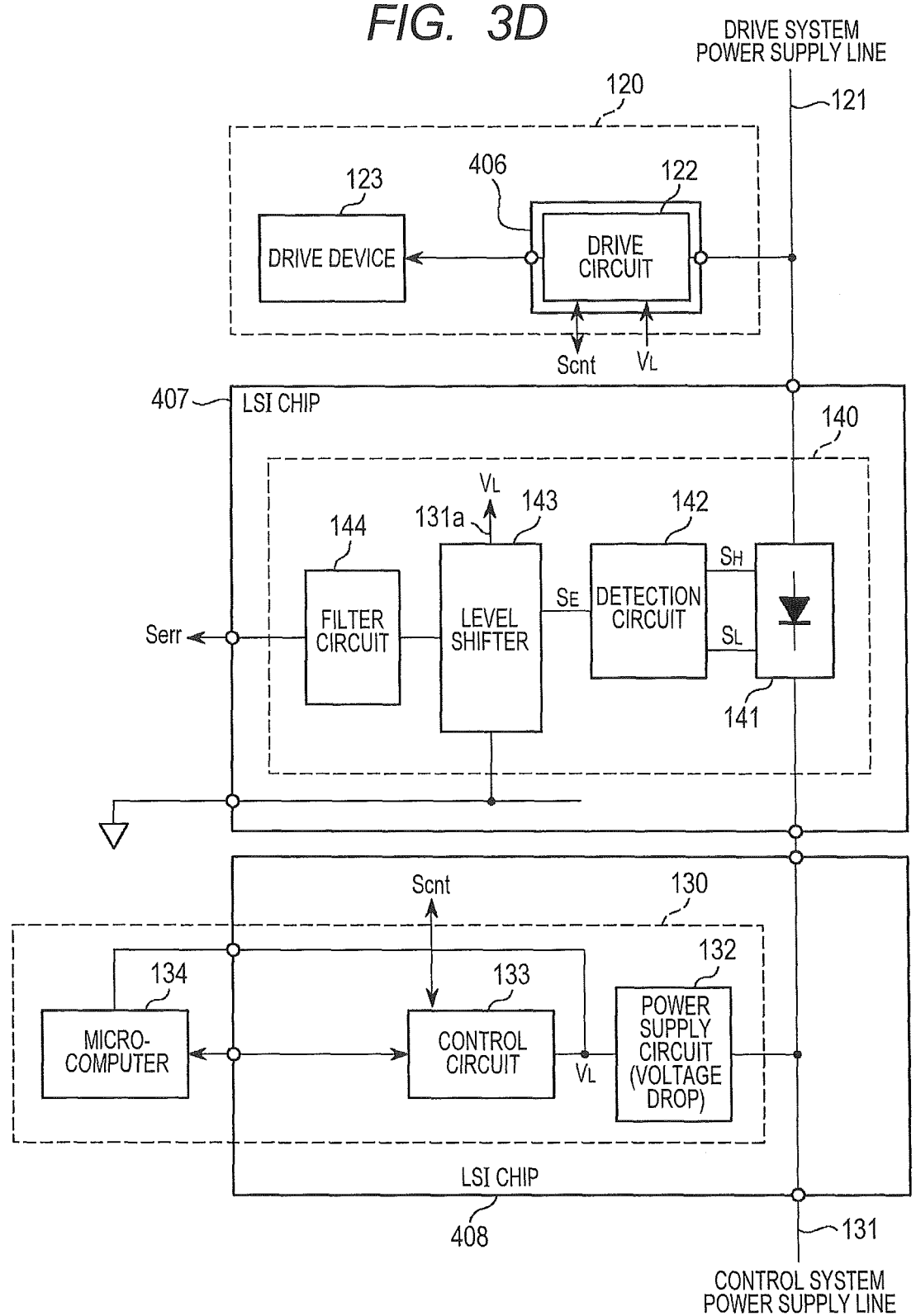
FIG. 3D is a block diagram of still another example of the mounting of the LSI chip with respect to the power compensation circuit as the semiconductor device according to the first embodiment.

FIG. 3D is an example in which the drive circuit 122 of the drive system block 120 is mounted on one LSI chip 406, the power compensation circuit 140 is mounted on another LSI chip 407, and the power supply circuit 132 and control circuit 133 of the control system block 130 are mounted on still another LSI chip 408. In this case, the LSI chips are divided by functions to increase the flexibility of the design and wiring. Note that the microcomputer 134 may be included in the LSI chip 408. Further, the LSI chip 406 of the drive system block 120 may have a single-chip structure in which the power device and the control IC are mounted on a single chip, or a multi-chip structure in which the power device and the control IC are mounted on separate chips.

Second Embodiment

Hereinafter, a semiconductor device according to a second embodiment will be described with reference to the accompanying drawings. In the present embodiment, the details of the power compensation circuit (semiconductor device) according to the first embodiment will be described.

Configuration

Figure 4A:
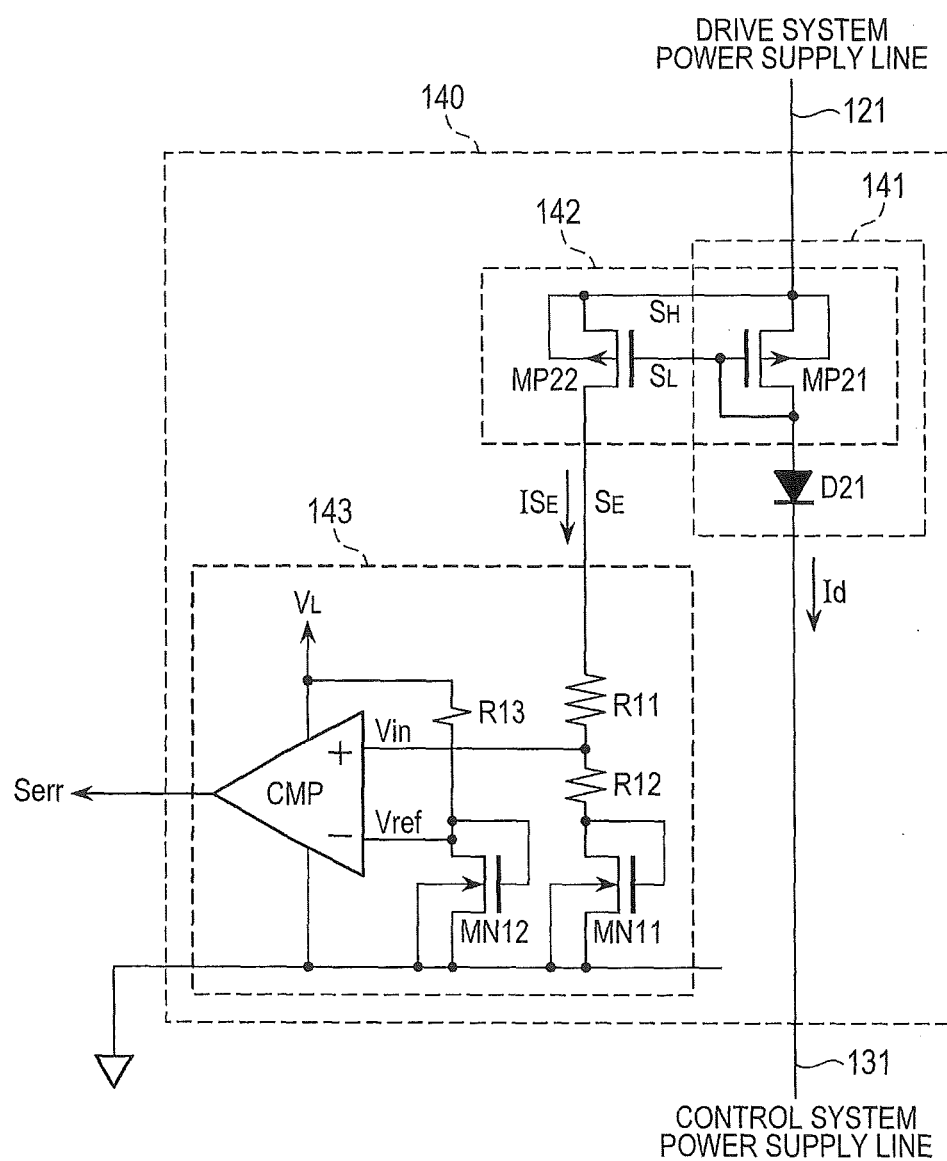
FIG. 4A is a circuit diagram of an example of a power compensation circuit as a semiconductor device according to a second embodiment.

FIG. 4A is a circuit diagram of an example of a power compensation circuit as the semiconductor device according to the present embodiment. The power compensation circuit 140 includes the rectifier circuit 141, the detection circuit 142, and the level shifter 143.

The rectifier circuit 141 includes a PchMOS transistor MP21 and a diode D21. In the PchMOS transistor MP21, the source (and substrate potential) is coupled to the drive system power supply line 121 and the gate is coupled to the drain. Thus, the PchMOS transistor MP21 is a so-called diode-coupled MOS transistor. In the diode D21, the anode is coupled to the drain of the PchMOS transistor MP21, and the cathode is coupled to the control system power supply line 131. In the present embodiment, the signal SH corresponding to the high voltage terminal is obtained from the source of the PchMOS transistor MP21, and the signal SL corresponding to the low voltage terminal is obtained from the connection point of the drain and gate of the PchMOS transistor MP21, respectively. The current flowing through the diode-coupled PchMOS transistor MP21 and the diode D21 is defined as the current Id. Further, in the present embodiment, a single-stage diode is used. However, it is possible to design to use two- or more-stage diodes. The voltage difference at the start of power supply to the control system power supply line 131 from the drive system power supply line 121 can be adjusted by the number of stages. In other words, when the series coupling of the diode D21 is in a single stage, the power supply is started with a voltage difference of −(|VTP|+VF) from the drive system power supply line 121 to the control system power supply line 131. However, when the series coupling of the diode D21 is in n stages, the power supply is started with a voltage difference of −(|VTP|−nVF). Note that the voltage VF is the value of the forward voltage drop of the diode D21. The voltage level VTP is a negative value, which is the threshold voltage of the PchMOS transistors MP21 and MP22.

The detection circuit 142 includes the PchMOS transistor MP21 of the rectifier circuit 141, and the PchMOS transistor MP22. In the PchMOS transistor MP22, the source (and substrate potential) is coupled to the drive system power supply line 121, and the gate is coupled to the connection point of the gate and drain of the PchMOS transistor MP21. In other words, the PchMOS transistor MP22 is configured such that the source is coupled to the signal SH corresponding to the high voltage terminal, and the gate is coupled to the signal SL corresponding to the low voltage terminal. At this time, the detection circuit 142 forms a so-called current mirror circuit by the PchMOS transistor MP21 and the PchMOS transistor MP22. Here, the PchMOS transistor MP21 in which the gate and the drain are coupled is referred to as the input stage of the mirror circuit. Further, the PchMOS transistor MP22 with the gate and source common to the input-stage PchMOS transistor MP21 is referred to as the output stage of the mirror circuit. Further, the input stage of the current mirror circuit functions as a current-voltage conversion circuit to convert the source-drain current into the source-gate voltage. Then, the output stage of the current mirror circuit functions as a voltage-current conversion circuit to convert the voltage signal received from the input stage into a current, and output the current. At this time, the source-drain current value in the input stage of the current mirror circuit is proportional to the source-drain current value in the output stage of the current mirror circuit by the gain (hfe) of the transistor. Thus, for example, if the type of the transistor of the input stage of the current mirror circuit, and the type of the transistor of the output stage of the current mirror circuit are the same with the same dimensions (channel width w, channel length 1), the gains are also the same, and thus the source-drain current values are the same. The drain of the PchMOS transistor MP22 outputs the detection signal SE. In the present embodiment, the detection signal SE and the current ISE are 0 when the rectifier circuit 141 is turned off, and are proportional to the current Id flowing through the input stage of the current mirror circuit when the rectifier circuit 141 is turned on.

The level shifter 143 includes a resistance R11 (first resistance), a resistance R12 (second resistance), an NchMOS transistor MN11 (first MOS transistor), a resistance R13 (third resistance), an NchMOS transistor MN12 (second MOS transistor), and a comparator CMP. The resistance R11, the resistance R12, and the NchMOS transistor MN11 are serially coupled between the output node of the detection signal SE of the detection circuit 142, and the reference power supply GND. One end of the resistance R11 is coupled to the output node of the detection signal SE, and the other end of the resistance R11 is coupled to one end of the resistance R12. The other end of the resistance R12 is coupled to the drain of the NchMOS transistor. The NchMOS transistor is configured such that the gate is coupled to the drain, and the source and the substrate are coupled to the reference power supply GND. The resistance R13 and the NchMOS transistor MN12 are serially coupled between the power supply line 131a that supplies the logic voltage VL, and the reference power supply GND. One end of the resistance R13 is coupled to the power supply line 131a, and the other end of the resistance R13 is coupled to the drain of the NchMOS transistor MN12. The NchMOS transistor MN12 is configured such that the gate is coupled to the drain, and the source and the substrate are coupled to the reference power supply GND. The comparator CMP runs with the logic power supply VL and the reference power supply GND. In the comparator CMP, the normal input (+terminal) is coupled to the connection point of the resistances R11 and R12 to input the input signal Vin to the comparator CMP. Further, the reversal input (−terminal) is coupled to the connection point of the resistance R13 and the drain of the NchMOS transistor MN12 to input the reference signal Vref to the comparator CMP. Then, the comparator CMP outputs the error signal Serr.

At this time, the value of the resistance R12 is set so that the value of the voltage drop (=R12×ISE) is greater than the maximum value of the input offset voltage of the comparator CMP. Further, the comparator CMP should at least have the rail feature (to properly operate at a voltage in the vicinity of the reference power supply voltage GND) on the side of the reference power supply GND. This can be achieved by using the existing rail-to-rail operational amplifier without feedback, as a comparator.

Figure 4B:
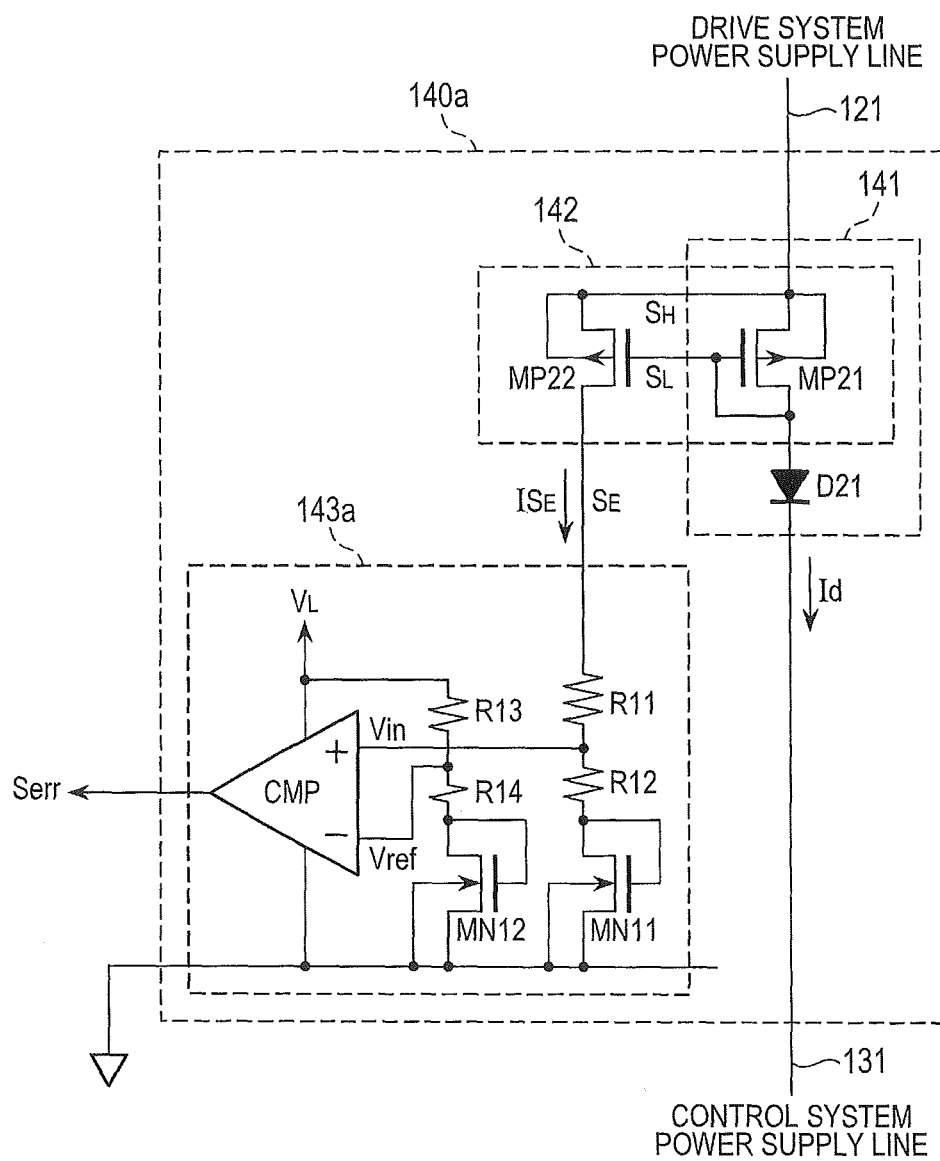
FIG. 4B is a circuit diagram of another example of the power compensation circuit as the semiconductor device according to the second embodiment.

However, the level shifter 143 may have other configurations. FIG. 4B is a circuit diagram of another configuration example of the power compensation circuit as the semiconductor device according to the present embodiment. In this figure, a power compensation circuit 140a includes a level shifter 143a which is different from the level shifter 143 shown in FIG. 4A. More specifically, the level shifter 143a further includes a resistance R14 between the resistance R13 and the NchMOS transistor MN12. In the comparator CMP, the reversal input (−terminal) is coupled to the connection point of the resistances R13 and R14 to input the reference signal Vref to the comparator CMP. The resistance R14 selects the resistance value so that the voltage drops by the maximum offset voltage or more of the comparator CMP. The resistance R12 selects the resistance value so that the voltage drop is, for example, twice the resistance R14 when the detection signal SE is active. With this configuration, it is possible to ensure that the error signal Serr is turned off when the detection signal SE is inactive, and the error signal Serr is turned on when the detection signal SE is active, even if the comparator CMP has an input offset.

Operation

FIG. 5 is a waveform diagram showing the signal voltage of the power compensation circuit as the semiconductor device according to the present embodiment. The operation of the configuration in FIG. 4A will be described below. The operation is the same as the case in the configuration shown in FIG. 4B. Here, the signal of (a) "drive system power supply (SH)" is the voltage value of the drive system power supply line 121, which is the same as the signal SH corresponding to the high voltage terminal. The signal of (b) "control system power supply" is the voltage value of the control system power supply line 131. The signal of (c) "detection signal (ISE)" is the current waveform of the detection signal SE, which is the output of the detection circuit 142. The signal of (d) CMPp (Vin) is the input signal Vin of the normal input terminal of the comparator CMP. The signal of (e) CMPn (Vref) is the input signal Vref of the reversal input terminal of the comparator CMP. The signal of (f) "error signal (Serr)" is the output of the level shifter 143, which is the error signal Serr as the output of the power compensation circuit 140.

The level of the voltage VBatt is the voltage level of the battery 111. The voltage VF is the value of the forward voltage drop of the diode D21. The voltage level VTP is a negative value, which is the threshold voltage when the source and the substrate in the PchMOS transistors MP21 and MP22 are the same potential. The voltage level VTP is based on the battery voltage VBatt as the reference voltage. The voltage level GND is the voltage level of the reference power supply GND. The voltage level VL is the voltage level of the logic power supply VL. The voltage level VTN is the threshold voltage of the NchMOS transistors MN11 and MN 12 when the source and the substrate in the NchMOS transistors MN11 and MN12 are the same potential. The voltage level VTN is based on the reference power supply GND as the reference voltage. Here, for example, the value of the voltage VF is about 0.7 V for the silicon diode, and the values of the voltages VTP and VTN are around 1 V.

The time t0 is the time when, the control system power supply line 131 is the voltage VBatt which is the same voltage of the drive system power supply line 121. The time t1 is the time when the control system power supply line 131 is disconnected (open). The time t2 is the time when the control system power supply line 131 returns to the voltage VBatt, which is the same voltage of the drive system power supply line 121, due to repair or recover from the disconnection after the time t1. In general, the disconnection is repaired in the state in which the main power supply is cut off. However, this waveform diagram shows that there is no problem if it is repaired (recovered) with the main power supply coupled thereto.

The voltage value of the signal SH is substantially equal to the battery voltage VBatt and is constant, regardless of time, except when operation noise occurs. Also, the voltage (Vref) of the reversal input terminal CMpn of the comparator CMP constantly takes the value of the voltage level VTN, which is the voltage value between the value of the reference power supply GND and the value of the logic power supply VL, regardless of time.

At the time t0, the voltage of the control system power supply line 131 and the voltage of the drive system power supply line 121 are equal to each other. Thus, the rectifier circuit 141 is turned off. At this time, if the drive system power supply (SH) runs and a voltage drop occurs, the voltage applied to the diode D21 remains reverse biased. Thus, the PchMOS transistor MP21 remains off and this state is stable. At this time, the current value of the detection signal (ISE) is 0, so that no current flows through the resistances R11, R12, and the NchMOS transistor MN11 that are serially coupled to the detection signal (ISE). Thus, all the voltages are equal at the two ends of the resistances R11 and R12. The voltage of the source and the voltage of the drain in the NchMOS transistor MN11 take a value close to the reference power supply GND, which will be described below in the explanation of the time t2. Thus, the signal of the reversal input terminal CMPp with the same potential as the source and drain voltage also takes a value close to GND.

The signal of the normal input terminal CMPp of the comparator CMP is approximately the GND voltage, and the constant voltage Vref (voltage VTN) is input to the reversal input terminal CMPn. Thus, the comparator CMP outputs a low level. In other words, the level of the error signal Serr is a low level (without error).

At the time t1, the control system power supply line 131 is disconnected and the power supply is stopped. Then, the load of the control system block 130 draws a current, so that the voltage of the control system power supply line 131 is reduced. When the voltage of the control system power supply line 131 is reduced to VBatt−(|VTP|+VF) or less, both the PchMOS transistor MP21 and the diode D21 are turned on. Then, the current Id flows from the drive system power supply line 121 to the control system power supply line 131 through the on-state PchMOS transistor MP21 and the on-state diode D21. Thus, power is supplied to the control system power supply line 131. The voltage passing through the PchMOS transistor MP21 and the diode D21 is reduced by the drive system power supply line 121 by the threshold voltage drop |VTP| and the forward voltage drop VF of the diode. As a result, the voltage of the control system power supply line 131 changes to the value of VBatt−(|VTP|+VF). Thus, the power of (VBatt−(|VTP|+VF))×Id is supplied from the drive system power supply line 121 to the control system power supply line 131. At this time, the PchMOS transistor MP22, which forms the current mirror with the PchMOS transistor MP21, is turned on to allow a current to flow. The voltage of the drive system power supply line 121 is applied to the gate of the NchMOS transistor MN11 through the on-state PchMOS transistor MP 22 and the resistances R11 and R12, to increase the voltage. When the voltage is increased to GND+VTN or more, the NchMOS transistor MN11 is turned on. As a result, the PchMOS transistor MP22 outputs the current ISE of the gain of the PchMOS transistors MP21 and MP22. This is the detection signal SE. The NchMOS transistor MN11 is a so-called diode-coupled transistor in which the drain and the gate are coupled to each other. Thus, the source-drain voltage is approximately the value of the threshold voltage VTN of the NchMOS transistor. The voltage of the normal input terminal CMPp of the comparator CMP is the voltage signal Vin at one end of the resistance R12 which is serially coupled to the NchMOS transistor MN11 at the other end. Further, because the current ISE is a positive value, the voltage Vin of the normal input terminal CMPp of the comparator CMP is Vin=VTN+R12×ISE>VTN. The value of the voltage Vref of the reversal input terminal CMPn of the comparator CMP is VTN, so that the comparator CMP outputs a high level. In this way, the power compensation circuit 140 outputs a signal of a high level (with error) as the error signal Serr.

The time t2 is the time when the disconnection of the power supply line (for example, the harness 114b) to the control system block 130 is repaired and the power supply line is coupled to the battery 111. The voltage of the control system power supply (SL) returns to the voltage VBatt of the battery, so that the voltage of the source of the PchMOS transistor MP21 and the voltage of the anode of the diode D21 are equal to each other. Thus, the rectifier circuit 141 is turned off. Then, the power supply from the drive system power supply line 121 to the control system power supply line 131 is stopped. In response to this, the PchMOS transistor MP21 of the current mirror input stage is turned off, so that the PchMOS transistor MP22 of the current mirror output stage is also turned off. Thus, the current flowing through the resistances R11, R12 is 0, and the voltage of the gate of the NchMOS transistor MN11 is rapidly reduced. The source-drain voltage of the NchMOS transistor MN11 is the threshold voltage VTN of the Nch-MOS transistor, and gradually approaches the reference power supply GND by the sub-threshold current of the NchMOS transistor MN11 as time passes. Along with this, all the voltages at the two ends of the resistances R11 and R12 approach the reference power supply GND. In other words, the signal Vin of the normal input terminal CMPp of the comparator CMP also approaches GND. When the voltage of the signal Vin is lower than the voltage of the signal Vref, the comparator CMP outputs a low level. In other words, the power compensation circuit 140 outputs a signal of a low level (without error) as the error signal Serr. In this example, as described above, it is assumed that the control system power supply line 131 is repaired (recovered) with the main power supply (for example, the battery 111) coupled thereto. However, when the main power supply is cut off and the repair is performed, the voltage Vin is the reference power supply GND from the beginning. Thus, when the main power supply is coupled after completion of the repair, the state remains unchanged from the beginning. In this way, the power compensation circuit 140 outputs a signal of a low level (without error) as the error signal Serr.

Also in the present embodiment, the same effect as the first embodiment can be achieved.

Further, the present embodiment uses the voltage at the connection point of the drain and gate of the PchMOS transistor MP21 as the signal SL corresponding to the low voltage terminal. Thus, when the control system power supply line 131 is properly coupled, the diode D21 is turned off, so that the detection circuit 142 is separated from the control system power supply line 131. For this reason, when a large power supply noise is instantaneously applied to the drive system power supply line 121 and the control system power supply line 131, the possibility of a malfunction of the detection circuit 142 can be reduced.

First Variation

Figure 6:
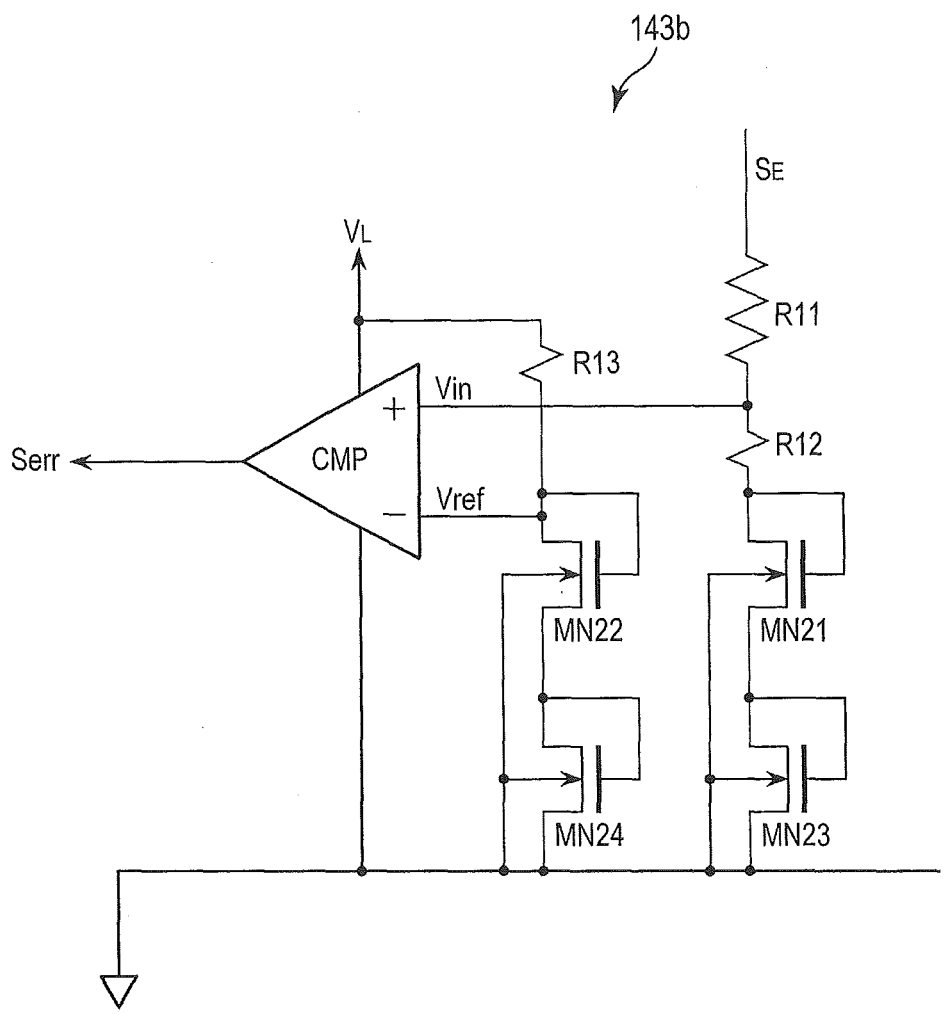
FIG. 6 is a circuit diagram of a variation a level shifter.

The level shifter 143 may have other configurations. FIG. 6 is a circuit diagram of a variation of the level shifter. The difference between a level shifter 143b and the level shifter 143 is the number of stages of the diode-coupled NchMOS transistor that generates the input signal Vin of the comparator CMP as well as the reference voltage signal Vref. The level shifter 143b has a two-stage structure of diode-coupled NchMOS transistor. Of course, the number of stages of the series coupling is not limited to two stages, and may be three or n (where n is a natural number of 3 or more) stages.

More specifically, the diode-coupled NchMOS transistor MN23 is configured such that the drain is coupled to the source of the diode-coupled NchMOS transistor MN21, and the source is coupled to the reference power supply GND. Further, the diode-coupled NchMOS transistor MN24 is configured such that the drain is coupled to the source of the diode-coupled NchMOS transistor MN22, and the source is coupled to the reference power supply GND.

With this configuration, it is possible to increase the voltage of the comparator CMP when the input signal Vin is active, as well as the voltage of the reference potential Vref, by the threshold voltage VTN of the NchMOS transistor. The same effect as shown in FIGS. 4A and 4B can also be achieved by an inexpensive comparator without rail-to-rail capability of the comparator CMP on the side of the reference power supply GND.

Second Variation

Figure 7:
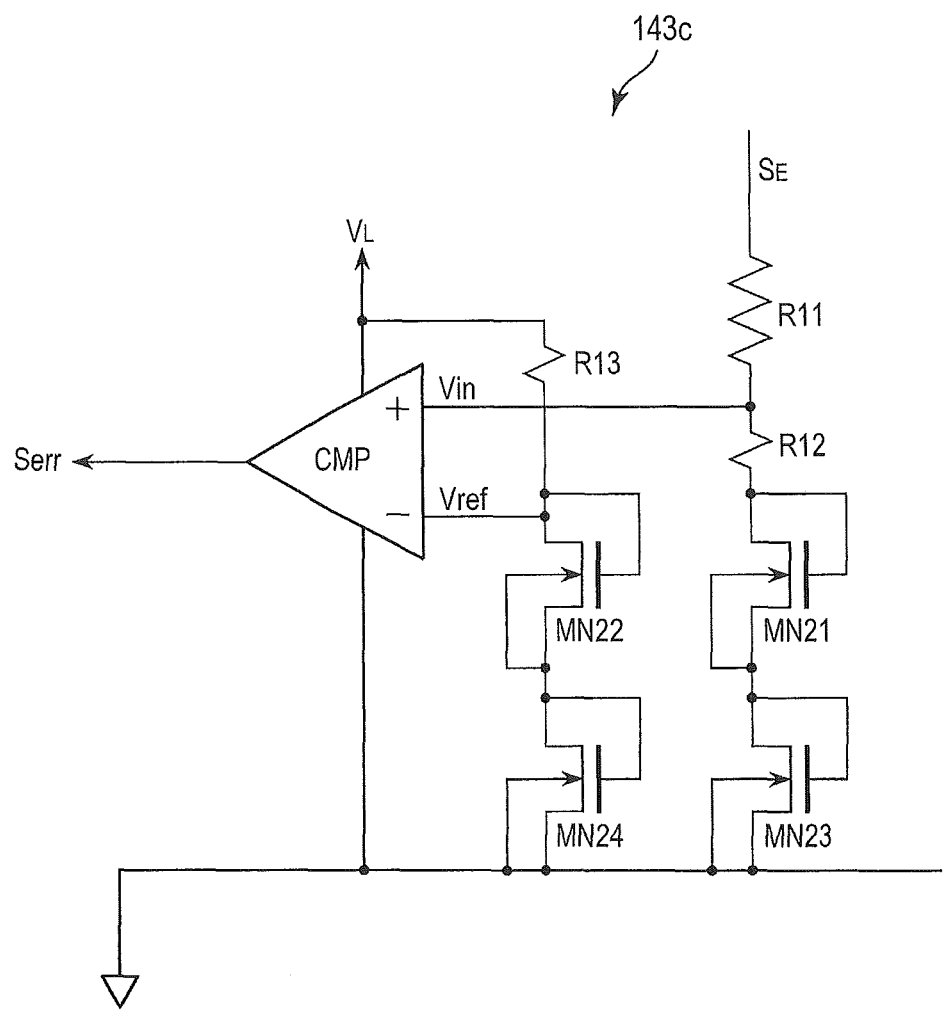
FIG. 7 is a circuit diagram of another variation of the level shifter.

The level shifter 143 may also have another configuration. FIG. 7 is a circuit diagram of another variation of the level shifter. A level shifter 143c is different from the level shifter 143b (FIG. 6) in that the substrate potential of the upper transistor of the diode-coupled NchMOS transistors that are serially coupled is taken from the source of the particular transistor. That is, the substrate potential of the NchMOS transistor MN21 can be a source voltage. Of course, the number of stages of the series coupling is not limited to two stages, and may be 3 or n stages.

More specifically, the substrate potential of the diode-coupled NchMOS transistor MN21 is taken from the source of the NchMOS transistor MN21. The substrate potential of the diode-coupled NchMOS transistor MN22 is taken from the source of the NchMOS transistor MN22.

With this configuration, there is no need to take into account the back bias effect of the NchMOS transistors MN21 and MN2. Thus, it is possible to increase the voltage of the comparator CMP when the input signal Vin is active, as well as the voltage of the reference potential Vref by the threshold voltage VTN of the respective NchMOS transistors, more accurately than using the level shifter 143b. The same effect as shown in FIGS. 4A and 4B can also be achieved by an inexpensive comparator without rail-to-rail capability of the comparator CMP on the side of the reference power supply GND.

Third Variation

Figure 8:
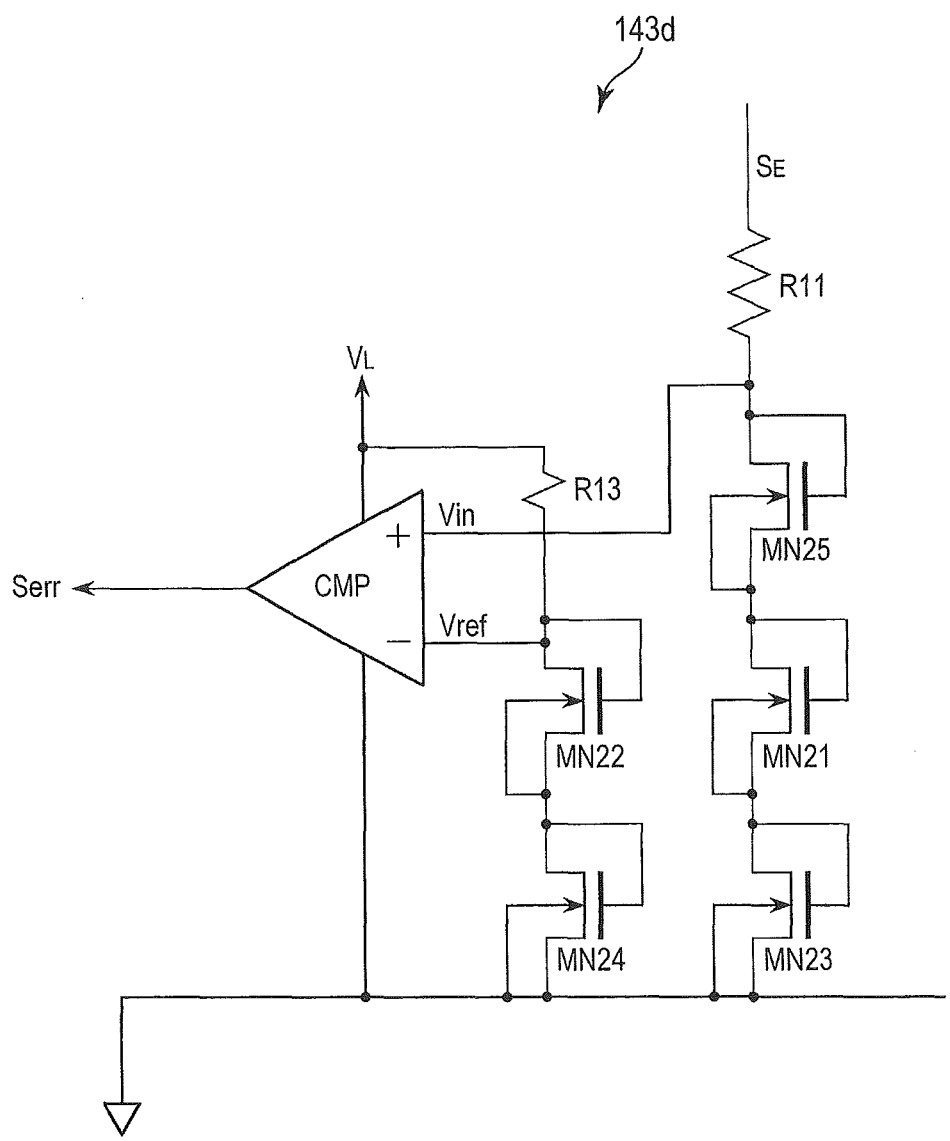
FIG. 8 is a circuit diagram of still another variation of the level shifter.

The level shifter 143 may have still another configuration. FIG. 8 is a circuit diagram of still another variation of the level shifter. A level shifter 143d is different from the level shifter 143c (FIG. 7) in that a diode-coupled NchMOS transistor MN25 is used in place of the resistance R12. In this example, the diode-coupled NchMOS transistor MN25 is shown as a single stage, but of course, the number of stages of the series coupling may also be two or more stages.

More specifically, the diode-coupled NchMOS transistor MN25 is configured such that the drain and the gate are coupled to the other end of the resistor R11, and the source is coupled to the drain and the gate of the NchMOS transistor MN21. The comparator CMP takes the input signal Vin from the connection point of the resistance R11 and the drain of the NchMOS transistor MN25.

With this, configuration, it is possible to increase the value of the input signal Vin of the comparator CMP, to a voltage higher than the reference voltage Vref of the comparator CMP by the threshold voltage VTN of the NchMOS transistor, regardless of the current value when the detection signal SE is tuned on. In this way, the same effect as shown in FIGS. 4A and 4B can be achieved.

Third Embodiment

Hereinafter, a semiconductor device according to a third embodiment will be described with reference to the accompanying drawings. In the present embodiment, the configuration of the level shifter of the power compensation circuit is different from the configuration of the second embodiment. The following description will focus on this difference.

Configuration

Figure 9A:
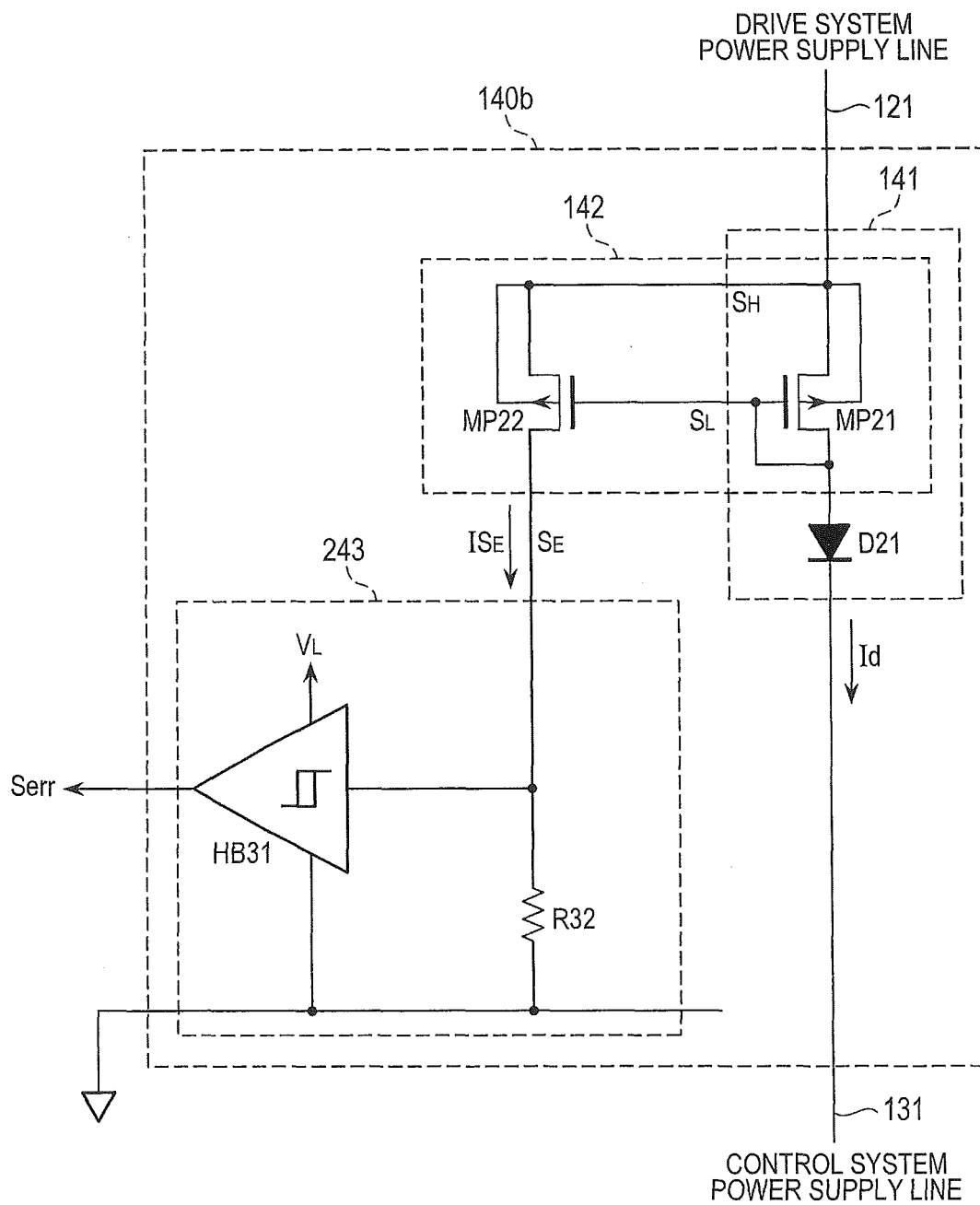
FIG. 9A is a circuit diagram of an example of a power compensation circuit as a semiconductor device according to a third embodiment.

FIG. 9A is a circuit diagram of an example of a power compensation circuit as the semiconductor device according to the present embodiment. A power compensation circuit 140b includes the rectifier circuit 141, the detection circuit 142, and a level shifter 243. The rectifier circuit 141 is the same as the rectifier circuit 141 of the second embodiment (FIGS. 4A, 4B). Also, the detection circuit 142 is the same as the detection circuit 142 of the second embodiment (FIGS. 4A, 4B).

The level shifter 243 includes a resistance R32 and a hysteresis buffer HB31. One end of the resistance R32 is coupled to the detection circuit 142 and the other end thereof is coupled to the reference power supply GND. The detection signal SE is input to one end of the resistance R32 from the detection circuit 142. The hysteresis buffer HB31 runs with the logic power supply VL and the reference power supply GND. The input terminal of the hysteresis buffer HB31 is couple to one end of the resistance R32 to output the error signal Serr.

Operation

When the rectifier circuit 141 is turned off, the diode D21 is turned off, so that the current flowing through the PchMOS transistor MP21 of the input stage of the current mirror circuit is 0. The current flowing through the PchMOS transistor MP22 of the output stage of the current mirror circuit is also 0, so that the PchMOS transistor MP22 is turned off. The detection signal SE is the signal in which the current ISE is 0 and the current flowing through the resistance R32 is 0. Thus, the two ends of the resistance R32 have the same potential (reference power supply GND). The potential of the input terminal of the hysteresis buffer HB31 is the reference power supply GND, so that the output is low level. In this way, the power compensation circuit 340 outputs a low level (without error) as the error signal Serr.

When the rectifier circuit 141 is turned on, the diode D21 and the PchMOS transistor MP21 are turned on to output the current Id. Then, the source-drain voltage of the diode-coupled PchMOS transistor MP21 is approximately the threshold voltage VTP, and the cathode-anode voltage of the diode D21 is approximately the forward voltage drop VF. Thus, the power of (VBatt−(|VTP|+VF))×Id is supplied from the drive system power supply line 121 to the control system power supply line 131. The PchMOS transistors MP21 and MP22 form a current mirror, in which the current corresponding to the gain flows through the PchMOS transistor MP22. If the gains of the PchMOS transistors MP21 and MP22 are the same, the detection current ISE is also Id.

Since the detection current ISE flows through the resistance R32, the voltage Vr32 at one end of the resistance R32 is Vr32=ISE×R32. The resistance value of the resistance R32 is designed so that the voltage Vr32 is greater than the input logic threshold at the start of the hysteresis buffer HB31. As a result, the output of the hysteresis buffer HB31 is high level. In this way, the power compensation circuit 340 outputs a high level (with error) as the error signal Serr.

At the time when the rectifier circuit 141 changes from the on state to the off state, the voltage of the source of the PchMOS transistor MP21 and the voltage of the anode of the diode D21 are equal to each other. Thus, the PchMOS transistor MP21 is turned off and the current is 0. At the same time, the current-mirror coupled PchMOS transistor MP22 is also turned off and the current is 0. As a result, the current ISE of the detection signal SE changes to 0 (without ON detection). In this way, the power compensation circuit 140b changes to a low level (without error) as the error signal Serr.

Also in the present embodiment, the same effect as those of the above embodiments can be achieved.

Further, in the present embodiment, the detection signal SE is current-voltage converted by the resistance R32, so that the input voltage of the comparator can be made 0 V immediately after the detection signal SE changes to 0 (off).

In other words, it is possible to make the error signal Serr have a low level (without error) in a shorter time. Further, the level shifter can be formed by the hysteresis buffer with a circuit scale smaller than the comparator. This results in a cost reduction.

Variation

Figure 9B:
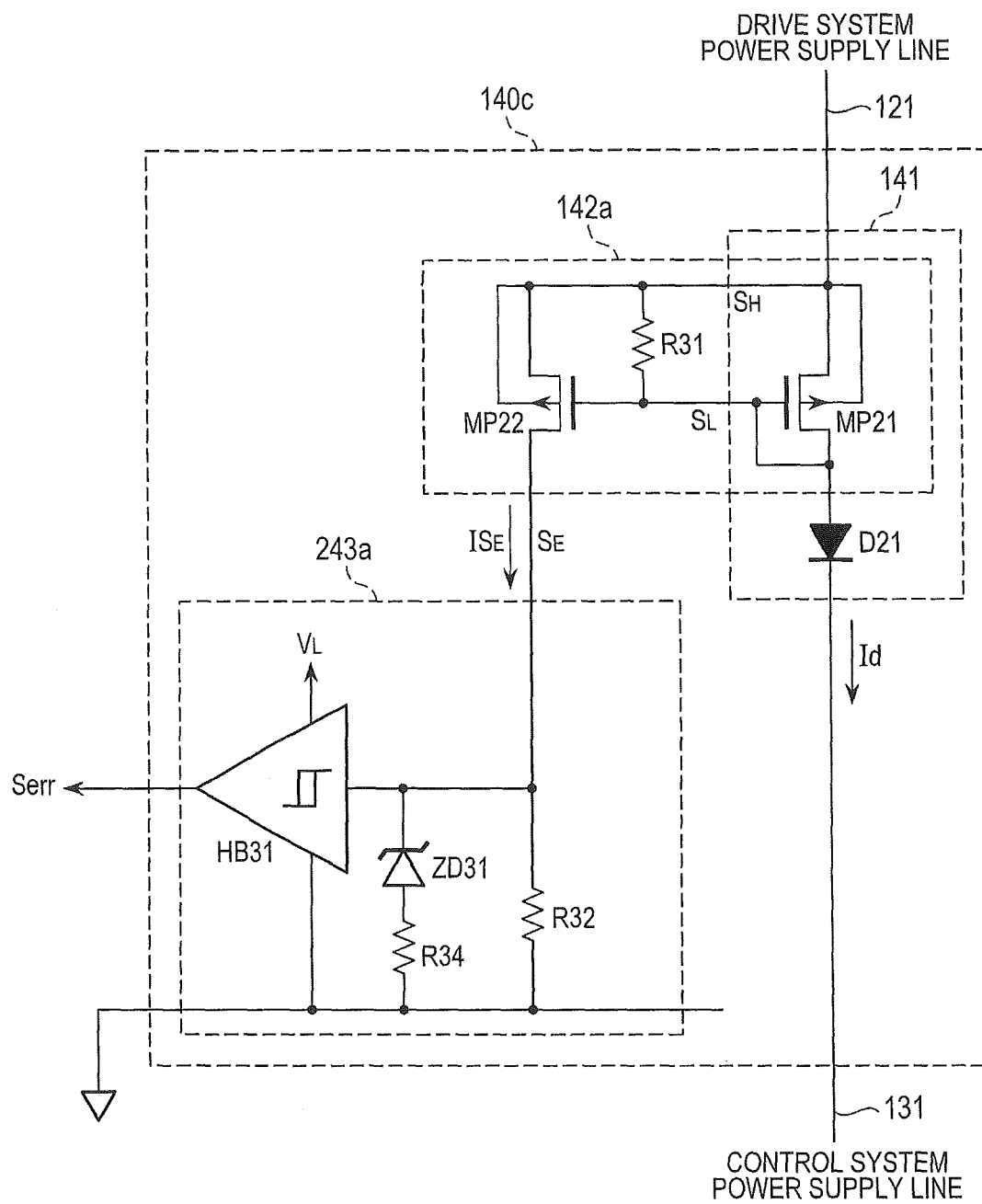
FIG. 9B is a circuit diagram of a variation of the power compensation circuit as the semiconductor device according to the third embodiment.

However, the power compensation circuit 140*b* may be modified as follows. FIG. 9B is a circuit diagram of a variation of the power compensation circuit as the semiconductor device according to the present embodiment. A power compensation circuit 140*c* includes the rectifier circuit 141, a detection circuit 142*a*, and a level shifter 243*a*. The rectifier circuit 141 is the same as the rectifier circuit 141 shown in FIG. 9A.

The detection circuit 142*a* further includes a resistance R31, in addition to the components of the detection circuit 142 shown in FIG. 9A. One end of the resistance R31 is coupled to the source of the PchMOS transistor MP21, and the other end is coupled to the gate of the PchMOS transistor MP21. Incidentally, the resistance R31 can also be applied to the detection circuit 142 of the second embodiment (FIGS. 4A, 4B).

The level shifter 243*a* includes a Zener diode ZD31 and a resistance R34, in addition to the components of the level shifter 243 shown in FIG. 9A. The Zener diode ZD31 is configured such that the cathode is coupled to one end of the resistance R34, and the anode is coupled to the input terminal of the hysteresis buffer HB31. The other end of the resistance R34 is coupled to the reference power supply GND.

Operation

When the rectifier circuit 141 is turned off, the diode D21 is turned off. Thus, in the PchMOS transistor MP21, the source and the gate have the same potential by the resistance R31. Then, the PchMOS transistor MP21 is turned off. Also in the PchMOS transistor MP22, the source and the gate are coupled to the resistance R31 and have the same potential, so that the PchMOS transistor MP22 is turned off. The detection signal SE is the signal in which the current ISE is 0 and the current flowing through the resistance R32 is also 0. Thus, the two ends of the resistance R32 have the same potential (the reference power supply GND). The potential of the input terminal of the hysteresis buffer HB31 is the reference power supply GND, so that the output is low level. In this way, the power compensation circuit 140*b* outputs a low level (without error) as the error signal Serr.

When the voltage of the control system power supply line 131 is lower than the voltage of the drive system power supply line 121 by the forward voltage drop VF or more of the diode D21, the diode D21 is turned on, and the initial current Id' flows through the resistance R31 and the diode D21. Then, when the product of the resistance value of the resistance R31 and the initial current Id', which is the voltage drop of the resistance R31, is greater than the absolute value of the threshold VTP of the PchMOS transistor MP21, the PchMOS transistor MP21 is turned on. When the gain of the PchMOS transistor MP21 and the resistance value of the resistance R31 are appropriately designed, the voltage of the two ends of the resistance R31 is clamped by the threshold VTP of the PchMOS transistor. As described above, the rectifier circuit 141 of this variation is different from the rectifier circuit 141 of FIG. 9A, in such a way that the start of the operation of the rectifier circuit 141 depends on the forward voltage drop VF of the diode D21.

In other words, if the voltage of the control system power supply line 131 is lower than the voltage of the drive system power supply line 121 by the forward voltage drop VF or more, the rectifier circuit 141 starts to be turned on. Then, the voltage difference increases when the current Id increases. However, with an appropriate design, the voltage difference is finally within |VTP|+VF as shown in FIG. 9A.

When the rectifier circuit 141 is turned on, the diode D21 and the PchMOS transistor MP21 are turned on, and the rectifier circuit 141 outputs the current Id. Then, the source-drain voltage of the diode-coupled PchMOS transistor MP21 is approximately the threshold value VTP, and the cathode-anode voltage of the diode D21 is approximately the forward voltage drop VF. At this time, the current Ir31 flowing through the resistance R31 is Ir31=VTP/R31. Thus, the source-drain current Imp21 of the PchMOS transistor MP21 is Imp21=Id−VTP/R31. The PchMOS transistors MP21 and MP 22 form a Current mirror, so that the current corresponding to the gain flows through the PchMOS transistor MP22. If the gains of the PchMOS transistors MP21 and MP22 are the same, the detection current ISE is also ISE=Imp21=Id−VTP/R31.

The detection current ISE flows through the resistance R32, so that the voltage Vr32 at one end of the resistance R32 is r32=ISE×R32. When the resistance values of the resistances R31 and R32 are designed so that the voltage Vr32 is greater than the input logic threshold at the start of the hysteresis buffer HB31, the output of the hysteresis buffer HB31 is high level. In this way, the power compensation circuit 340 outputs a high level (with error) as the error signal Serr.

When the rectifier circuit 141 changes from the on state to the off state, the current of the resistance R31 changes to 0, so that the two ends of the resistance R31 change to have the same potential. The gate and source of the PchMOS transistor MP21 coupled to the resistance R31 also change to have the same potential, so that the PchMOS transistor MP21 is turned off. At the same time, the gate and source of the current-mirror coupled PchMOS transistor MP22 change to have the same potential. Thus, the PchMOS transistor MP22 is also turned off, and the detection signal SE changes to a high impedance (without ON detection). In this way, the power compensation circuit 340 changes to a low level (without error) as the error signal Serr.

A partial circuit, in which the Zener diode ZD31 and the resistance R34 are serially coupled, has a function for clamping the value of the input voltage Vr32 so that the input voltage Vr32 does not exceed the input withstand voltage of the hysteresis buffer HB31 running with the logic power supply VL and the reference power supply GND.

Also in this variation, the same effect as the above embodiments can be achieved.

Further, in this variation, the output signals SH, SL of the rectifier circuit 141 can be constantly turned off (the same potential) when the rectifier circuit 141 is turned off, by the resistance R31. Further, when the rectifier circuit 141 changes from the on state to the off state, the output signals SH, SL of the rectifier circuit 241 can be turned off in a shorter time.

Fourth Embodiment

Hereinafter, a semiconductor device according to a fourth embodiment will be described with reference to the accompanying drawings. In the present embodiment, the configuration of the rectifier circuit and detection circuit of the power compensation circuit is different from the configuration of the second embodiment. The following description will focus on this difference.

Configuration

Figure 10A:
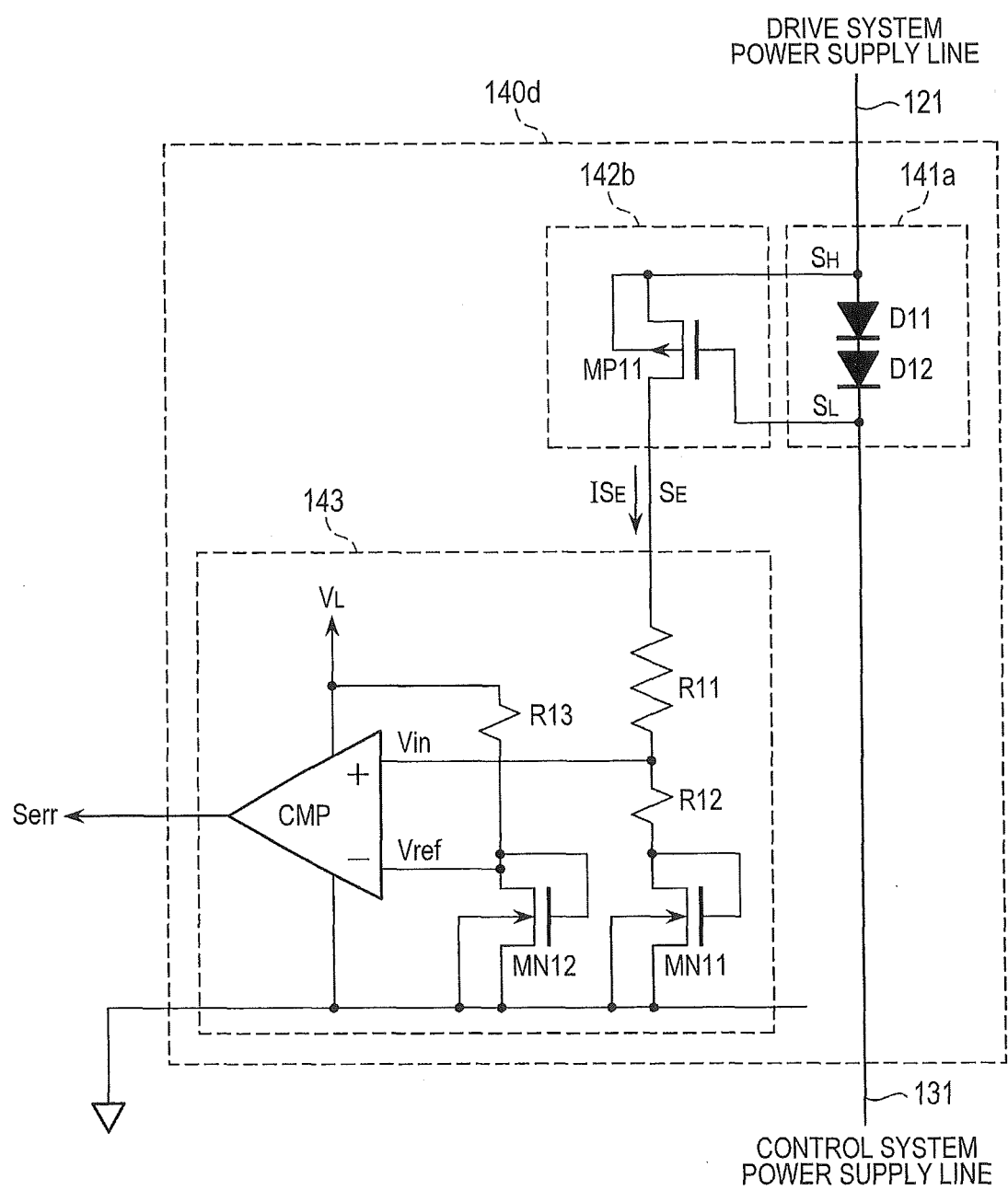
FIG. 10A is a circuit diagram of an example of a power compensation circuit as a semiconductor device according to a fourth embodiment.

FIG. 10A is a circuit diagram of a power compensation circuit as the semiconductor device according to the present embodiment. A power compensation circuit 140d includes a rectifier circuit 141a, a detection circuit 142b, and the level shifter 143.

The rectifier circuit 141a includes a diode D11 and a diode D12. The diodes D11 and D12 are serially coupled. The anode of the diode D11 is coupled to the drive system power supply line 121. The anode of the diode D12 is coupled to the cathode of the diode D11. The cathode of the diode D12 is coupled to the control system power supply line 131. The rectifier circuit 141a outputs the signal SH corresponding to the high voltage terminal from the anode of the diode D11. Further, the rectifier circuit 141a outputs the signal SL corresponding to the low voltage terminal from the cathode of the diode D12. In this example, the series coupling of the diodes (D11, D12) has two stages. However, the number of stages can also be designed to more than two stages. Based on the number of stages, it is possible to adjust the voltage difference at the start of the power supply from the drive system power supply line 121 to the control system power supply line 131. In other words, when the series coupling of the diodes has two stages, the power supply from the drive system power supply line 121 to the control system power supply line 131 is started with a voltage difference of −2×VF. When the series coupling of the diodes has n stages, the power supply is started with a voltage difference of −n×VF.

The detection circuit 142b includes a PchMOS transistor MP11. The source of the PchMOS transistor MP11 is coupled to the cathode of the diode D11, to which the signal SH corresponding to the high voltage terminal is supplied. Then, the gate of the PchMOS transistor MP11 is coupled to the anode of the diode D12, to which the signal SL corresponding to the low voltage terminal is coupled. Further, the source of the PchMOS transistor MP11 is coupled to the substrate potential. The detection circuit 142b outputs the detection signal SE from the drain of the PchMOS transistor MP11. The detection signal SE is the current signal in which the current value ISE is 0 when the PchMOS transistor MP11 is turned off, and the current ISE is a positive value when the PchMOS transistor MP11 is turned on.

The level shifter 143 is the same as the level shifter 143 of the second embodiment (FIG. 4A).

Figure 10B:
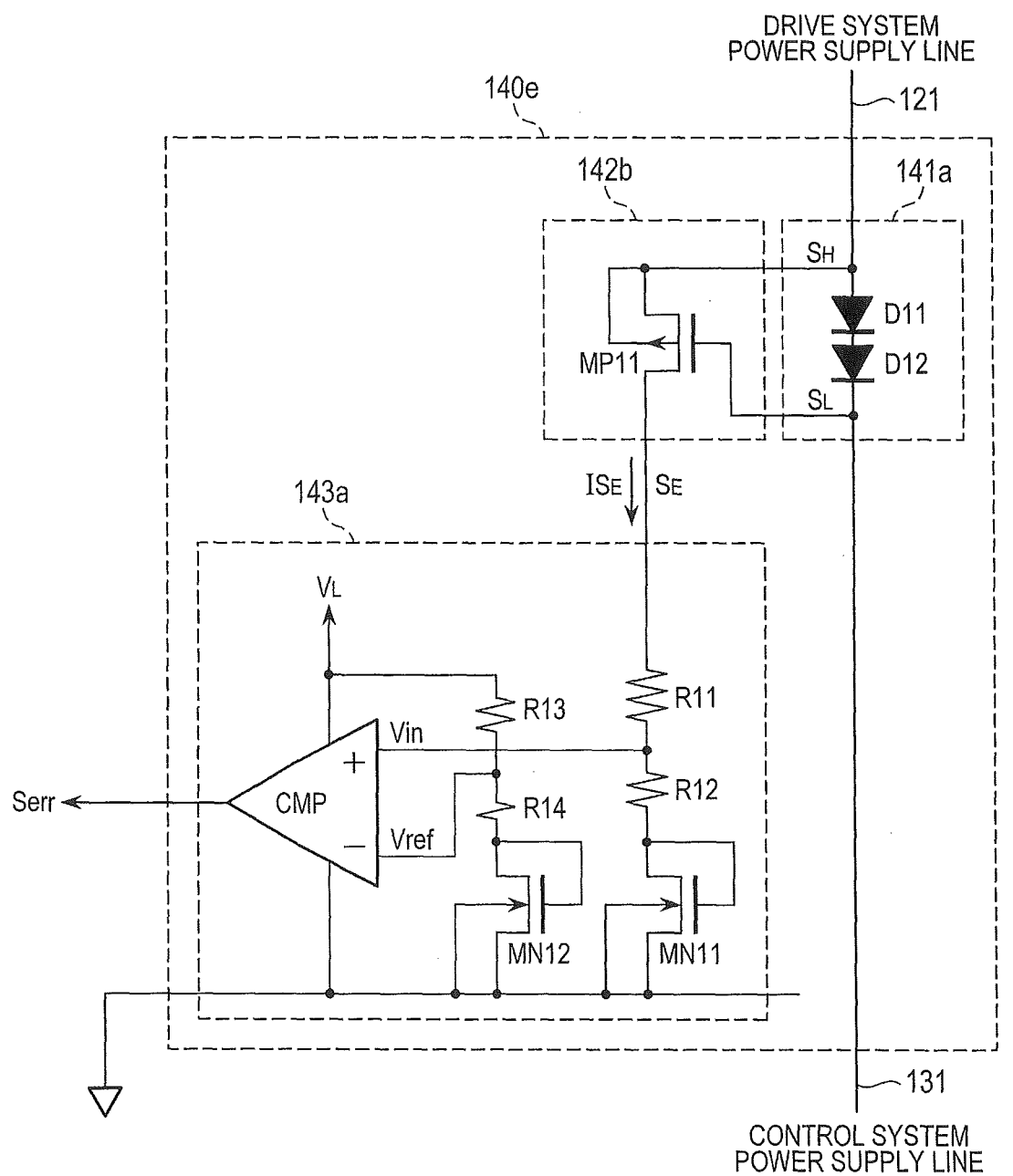
FIG. 10B is a circuit diagram of another example of the power compensation circuit as the semiconductor device according to the fourth embodiment.

However, the level shifter 143 may have other configurations. FIG. 10B is a circuit diagram of another configuration of the power compensation circuit as the semiconductor device according to the present embodiment. The figure shows a power compensation circuit 140e in which a level shifter 143a is different the level shifter 143 shown in FIG. 10A. The level shifter 143a shown here is the same as the one in another configuration example (FIG. 4B) of the second embodiment.

(Operation)

FIG. 11 is a waveform diagram of the signal voltage of the power compensation circuit as the semiconductor device according to the present embodiment. The following is the description of the operation in the configuration of FIG. 10A. The operation is the same as in the configuration shown in FIG. 10B. Here, the signals (a) to (f) are the same as those shown in FIG. 5 of the second embodiment. However, the signal of (c) "detection signal (SE)" is the detection signal SE as the output of the detection circuit 142b, which is represented by the voltage waveform.

Reference symbols in this figure are also the same as those in FIG. 5 of the second embodiment. However, the voltage VF is the value of the forward voltage drop of the diodes D11 and D12. Further, the threshold voltage VTP of the PchMOS transistor MP11 should be considered in such a way that its absolute value is the maximum value within the range of manufacturing errors allowed for the applicable product. In the present embodiment, a device with a threshold voltage of VF×2=1.4V>|VTP| is used. Of course, in the case of a device with VF×2<|VTP|, the number of series coupled diodes is increased to n units with VF×n>|VTP|.

At the time t0, the voltages of the signal SH and the signal SL are the same. Thus, the potentials of the source and gate of the PchMOS transistor MP11 are the same and the PchMOS transistor MP11 is turned off. At this time, if the drive system power supply (SH) runs and a voltage drop occurs, only the gate voltage of the PchMOS transistor MP11 increases above the source voltage. Thus, the PchMOS transistor MP11 remains in the off state and this state is stable. At this time, the ON detection signal (SE) is high impedance, so that the current does not flow through the resistances R11, R12 and the NchMOS transistor MN11, which are coupled to the ON detection signal SE. Thus, all the voltages at the two ends of the resistances R11 and R12 are equal to each other. The voltages of the source and drain of the NchMOS transistor MP11 take a value close to the reference power supply GND, so that the normal input terminal CMPp with the same potential also takes a value close to GND. The signal of the normal input terminal CMPp of the comparator CMP is approximately the GND voltage. Further, the constant voltage Vref (voltage VTN) is input to the signal of the reversal input terminal CMPn. Thus, the comparator CMP outputs a low level. In other words, the error signal Serr changes to low level (without error).

At the time t1, the control system power supply line 131 is disconnected and the power supply is stopped. Then, the load of the control system block 130 draws a current, so that the voltage of the control system power supply line 131 drops. When the voltage drops to VBatt−2VF or less, the diodes D11 and D12 are turned on. Then, the power is supplied from the drive system power supply line 121 to the control system power supply line 131 through the turned-on diodes D11 and D12. The power passing through the diodes D11 and D12 has a voltage lower than the drive system power supply line 121 by the voltage twice the forward voltage drop VF. At this time, the signal SL is the value of VBatt−2VF. Thus, the PchMOS transistor MP11 in which the source is coupled to the signal SH (voltage VBatt) and the gate is coupled to the signal SL (voltage VBatt−2VF) is turned on, because the voltage of the gate is lower than the voltage of the source by the threshold voltage VTP or more. A voltage of the drive system power supply line 121 is applied to the gate of the NchMOS transistor MN11 through the turned-on PchMOS transistor MP11 and the series-coupled resistances R11 and R12. Then, the voltage of the NchMOS transistor MN11 increases. When the voltage increases to GND+VTN or more, the NchMOS transistor MN11 is turned on, and the current ISE of the detection signal SE flows therethrough. The NchMOS transistor MN11 is the so-called diode-coupled transistor in which the drain and the gate are coupled. Thus, the source-drain voltage is approximately the value of the threshold voltage VTN of the NchMOS transistor. The voltage of the normal input terminal CMPp of the comparator CMP is the voltage signal Vin at one end of the resistance R12 that is serially coupled to the MchMOS transistor MN11 at the other end thereof. Thus, the voltage Vin of the normal input terminal CMPp of the comparator CMP is given by Vin=VTN+R12×

ISE>VTN, because the current ISE is a positive value. The value of the voltage Vref of the reversal input terminal CMPn of the comparator CMP is VTN, so that the comparator CMP outputs a high level. In this way, the power compensation circuit 140d outputs a signal of a high level (with error) as the error signal Serr.

The time t2 is the time when the disconnection of the power supply line (for example, the harness 114b) to the control system block 130 is repaired and the control system block 130 is coupled to the battery 111. The voltage of the control system power supply (SL) returns to the voltage VBatt of the battery. The voltages of the cathode and the anode in the diodes D11 and D12 are equal, so that the rectifier circuit 141a is turned off. Then, the power supply from the drive system power supply line 121 to the control system power supply line 131 is stopped. At this time, the voltages of the gate and source of the PchMOS transistor MP11 are the same, so that the PchMOS transistor MP11 is also turned off. Thus, the current flowing through the resistances R11 and R12 is 0, and the voltage of the gate of the NchMOS transistor MN11 is rapidly reduced. The source-drain voltage of the NchMOS transistor NM11 is the threshold voltage VTN of the MchMOS transistor, which is then gradually approaches the reference power supply GND by the sub-threshold current of the NchMOS transistor MN11 as time passes. In response to this, all the voltages at the two ends of the resistances R11 and R12 approach the reference power supply GND. In other words, the signal Vin of the normal input terminal CMPp of the comparator CMP also approaches GND. When the voltage of the signal Vin is lower than the voltage of the signal Vref, the comparator CMP outputs a low level. As described above, this example shows the case in which the control system power supply line 131 is repaired (recovered) with the main power supply being coupled thereto. However, when the power supply is cut off and the repair is performed, the voltage Vin is the reference power supply GND from the beginning. The state remains unchanged from the beginning when the main power supply is coupled after the completion of the repair. In this way, the power compensation circuit 140d outputs a signal of a low level (without error) as the error signal Serr.

The detection circuits (142, 142a) of the first to third embodiments detect that the rectifier circuit 141 applies the current of the rectifier circuit 141 (in the on state). On the other hand, in the present embodiment, the threshold voltage VTP of the PchMOS transistor MP11 is set to a value smaller than the voltage when the current flows through the rectifier circuit 141a (namely, VF×2), and the rectifier circuit 141b can reliably detect only when the current flows through the rectifier circuit 141a (in the on state).

Here, Japanese Patent No. 4618617 describes a method that compares the power supply voltage value from the reference voltage of the target controller, with the power supply voltage value measured from the reference voltage of the other controller. Originally, the method of Japanese Patent No. 4618617 may not determine whether the power supply voltage value of the target controller is appropriate when the power supply route of the other controller is disconnected. However, even if the power supply route of the other controller is normal, the method may provide incorrect information due to errors.

In other words, in Japanese Patent No. 4618617, when the voltage difference (detection threshold) between the power supply voltage value of the object to be detected and the power supply voltage value of the object to be compared is reduced, it is likely to provide incorrect information that the rectifier circuit is turned on although the rectifier circuit is not actually turned on, due to the error of the reference voltage between different controllers and to the error in the power supply voltage measurement circuit. If the margin of the voltage difference is increased in order to avoid the incorrect information, it is difficult to provide correct information when the rectifier circuit is turned on although the rectifier circuit is turned on. This makes it very difficult to design the voltage difference as the detection threshold.

On the other hand, in the present embodiment, just the voltage drop of the rectifier circuit is measured. With this configuration, the measurement is not influenced by the error of the reference voltage between different blocks. Further, in this configuration, just the voltage difference which is small with respect to the voltage value of the controller is measured, so that the accuracy is significantly improved. Thus, it is possible to reliably detect only when the rectifier circuit applies a current (or is turned on).

In the present embodiment, it is designed to measure the voltage with a predetermined voltage difference itself as the maximum value independent of the reference voltage, to allow the detection circuit to detect that the rectifier circuit applies the current (or is turned on) with high accuracy, preventing it to output incorrect information.

Also in the present embodiment, the same effect as the above embodiments can be achieved.

As described above, when a failure occurs in the power supply line of the control system block, the power compensation circuit as the semiconductor device according to each of the embodiments described above can supply power from the drive system block to the control system block, detect the current flowing through the control system block, and output as the detection signal to the outside. By using the detection signal, it is possible to promptly and reliably notify the outside about the failure of the power supply line of the control system block. In this way, the user of the apparatus using the semiconductor device can take measures such as the repair of the failure, to avoid hidden security problems that may occur in the particular apparatus.

Further, also in the case in which the semiconductor device according to each of the embodiments described above is applied to an apparatus other than a car, the same effect as those of the above embodiments can be achieved, similarly to the application to the car. However, the other apparatus includes two functional blocks to which the power is supplied so that if the power supply of one functional block is cut off, the power of the other functional block is supplied to the functional block in which the power is cut off.

In particular, when the semiconductor device according to each of the above embodiments is applied to a car, a significant effect can be achieved in terms of safe driving. The failure of the power supply line of the control system block 130 that the user may not detect poses a serious problem of safety in driving a car. To address this problem, the semiconductor device according to each of the above embodiments is applied to the car to quickly and reliably notify the user of the failure. In this way, the user can understand that the car breaks down and can take appropriate measures to avoid security problems.

It goes without saying that the various types of techniques described in the respective embodiments can be applied to other embodiments unless the technical inconsistency arises.

The present invention made by the present inventors has been described in reference to its embodiments. However, the present invention is by no means limited to the above embodiments, and can be changed or modified without departing from the scope of the present invention.

What is claimed is:

1. An electrical control system comprising:
a drive system block that receives power supply from a main power supply through a first power supply route to drive a load;
a control system block that receives power supply from the main power supply through a second power supply route to control the drive system block;
a power compensation circuit provided between a first power supply line within the drive system block and a second power supply line within the control system block, the first and second power supply lines being coupled to the first and second power supply routes, respectively; and
a notification device for notifying abnormality, in response to a signal based on a detection signal output from the power compensation circuit,
wherein the power compensation circuit includes:
a rectifier circuit coupled between the first and second power supply lines, to supply power from the first power supply line to the second power supply line when the voltage of the second power supply line is lower than the voltage of the first power supply line by a predetermined value or more; and
a detection circuit for outputting a detection signal when a current flows through the rectifier circuit.

2. The electrical control system according to claim 1, wherein the power compensation circuit further includes a level conversion circuit for converting the level of the detection signal into the voltage of a third power supply line to output a level converted signal.

3. The electrical control system according to claim 2, wherein the voltage of the third power supply line is lower than the voltages of the first and second power supply lines.

4. The electrical control system according to claim 2, wherein the input of the detection circuit is a voltage signal,
wherein the detection signal is a current signal, and
wherein the level conversion circuit includes:
serially coupled first and second resistances and a diode-coupled first MOS transistor, to which the current signal is supplied;
a serially coupled third resistance and a diode-coupled second MOS transistor; and
a comparison circuit for comparing the voltage of a first connection point of the first and second resistances as the input signal with the voltage of a second connection point of the third resistance and the second MOS transistor as the reference signal, to output the comparison result as the level converted signal.

5. The electrical control system according to claim 4, wherein the level conversion circuit further includes a fourth resistance coupled between the second connection point and the second MOS transistor.

6. The electrical control system according to claim 4, wherein the rectifier circuit converts the current of the rectifier circuit by a current-voltage conversion circuit, and outputs the result to the detection circuit.

7. The electrical control system according to claim 6, wherein the current-voltage conversion circuit includes an input stage of a current mirror circuit, and wherein the detection circuit includes an output stage of the current mirror circuit.

8. The electrical control system according to claim 7, wherein the current mirror circuit includes a resistance coupled between the source and gate of the MOS transistor in the input stage.

9. The electrical control system according to claim 4, wherein the first MOS transistor includes a plurality of diode-coupled MOS transistors that are serially coupled in n stages,
wherein the second MOS transistor includes a plurality of diode-coupled MOS transistors that are serially coupled in n stages; and
wherein n is an integer greater than or equal to 1.

10. The electrical control system according to claim 9, wherein the substrate potential of the first MOS transistor is a reference power supply voltage.

11. The electrical control system according to claim 9, wherein the substrate potential of the first MOS transistor is a source voltage.

12. The electrical control system according to claim 4, wherein the second resistance includes a diode-coupled third MOS transistor.

13. The electrical control system according to claim 2, wherein the detection signal is a current signal, and
wherein the level conversion circuit includes:
a first resistance supplied with the current signal; and
a buffer for receiving the voltage of the connection point of the first resistance on the detection circuit side as an input signal, and outputting an output signal as the level converted signal.

14. The electrical control system according to claim 13, wherein the buffer includes a hysteresis buffer.

15. The electrical control system according to claim 13, wherein the level conversion circuit further includes a Zener diode to limit the maximum voltage value of the input voltage signal of the buffer.

16. The electrical control system according to claim 13, wherein the rectifier circuit includes the input stage of a current mirror circuit, and
wherein the detection circuit includes the output stage of the current mirror circuit.

17. The electrical control system according to claim 16, wherein the current mirror circuit includes a resistance coupled between the source and gate of the MOS transistor in the input stage.

18. The electrical control system according to claim 2, further comprising a filter circuit to output one of the level converted signals that continues for a predetermined time or more, as the level converted signal.

19. The electrical control system according to claim 1, wherein the power supply for supplying power to the first power supply line and the power supply for supplying power to the second power supply line are common to the first and second power supply lines.

20. The electrical control system according to claim 1, wherein the power compensation circuit is integrated into a semiconductor device provided in at least either one of the drive system block and the control system block.

* * * * *